US012693561B2

(12) United States Patent
Jung

(10) Patent No.: US 12,693,561 B2
(45) Date of Patent: Jul. 28, 2026

(54) BACKLIGHT UNIT AND DISPLAY DEVICE COMPRISING THE SAME

(71) Applicant: LG Display Co., Ltd., Seoul (KR)

(72) Inventor: Sunghyun Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 255 days.

(21) Appl. No.: 18/534,000

(22) Filed: Dec. 8, 2023

(65) Prior Publication Data

US 2024/0192547 A1     Jun. 13, 2024

(30) Foreign Application Priority Data

Dec. 12, 2022    (KR) ........................ 10-2022-0172544

(51) Int. Cl.
G02F 1/13357 (2006.01)
(52) U.S. Cl.
CPC .. G02F 1/133608 (2013.01); G02F 1/133603 (2013.01)

(58) Field of Classification Search
CPC ..................... G02F 1/133608; G02F 1/133603
See application file for complete search history.

(56) References Cited

FOREIGN PATENT DOCUMENTS

| | | | | | |
|---|---|---|---|---|---|
| CN | 105739146 A | * | 7/2016 | ....... | G02F 1/133322 |
| JP | 2015040919 A | * | 3/2015 | ....... | G02F 1/133608 |
| KR | 10-2015-0090693 A | | 8/2015 | | |
| KR | 10-2016-0099774 A | | 8/2016 | | |

* cited by examiner

*Primary Examiner* — Lucy P Chien
(74) *Attorney, Agent, or Firm* — Birch, Stewart, Kolasch & Birch, LLP

(57) ABSTRACT

A backlight unit according to an example of the present disclosure includes a bottom chassis, a light source disposed on the bottom chassis, a reflective sheet disposed on the bottom chassis, an optical sheet disposed on the light source, supports disposed between the bottom chassis and the optical sheet for supporting the optical sheet and being spaced apart from each other, and a wire portion connecting the supports adjacent to each other.

29 Claims, 21 Drawing Sheets

BACKLIGHT UNIT AND DISPLAY DEVICE COMPRISING THE SAME

CROSS REFERENCE TO RELATED APPLICATION

The present application claims priority to Korean Patent Application No. 10-2022-0172544, filed in the Republic of Korea on Dec. 12, 2022, the entire contents of which is hereby expressly incorporated by reference into the present application.

BACKGROUND

Field

The present disclosure relates to a backlight unit and a display device, and more particularly to a backlight unit including a wire portion for preventing the lifting of a reflective sheet, and a display device including the same.

Discussion of the Related Art

A liquid crystal display (LCD) device is one of flat panel display devices which are being widely used. In general, in the liquid crystal display device, a liquid crystal material is filled between an upper substrate on which a common electrode, a color filter, etc., are formed and a lower substrate on which a thin film transistor, a pixel electrode, etc., are formed, and an electric field is formed by applying different potentials to the pixel electrode and the common electrode. Accordingly, the arrangement of liquid crystal molecules is changed to selectively transmit light (e.g., from a backlight unit), and thus, an image is displayed by controlling the transmittance of the light.

Since a liquid crystal display panel (LCD panel) of the liquid crystal display device is a non-emissive light receiving device, the liquid crystal display device generally includes a backlight unit for providing light to the liquid crystal display panel on the rear surface of the liquid crystal display panel.

A cold cathode fluorescent lamp (CCFL) and a light emitting diode (LED) are generally used as a light source in the backlight unit. Conventionally, the CCFL has been used since it has low power consumption and provides bright white light. However, the LED that has an excellent color reproducibility, a very long lifespan, and low power consumption is increasingly used compared to the CCFL.

The backlight unit is divided into an edge type and a direct type in accordance with the position of a light source with respect to the liquid crystal display panel. The edge type backlight unit is provided with a light source located on a side surface of the liquid crystal display panel and provides light through a light guide plate from the side surface. On the other hand, the direct type backlight unit is provided with a light source located on a rear surface of the liquid crystal display panel and provides light to the liquid crystal display panel. Among them, the direct type backlight unit has advantages of having a high light utilization rate, being easier to handle, having an unlimited size of the display panel, and being relatively inexpensive.

When a point light source such as an LED is used as a light source of the direct type backlight unit, LED light is refracted by an optical lens placed on the light emitting surface of an LED package. This allows the LED light having strong straightness to be uniformly distributed over the entire liquid crystal display panel without being focused over the light emitting surface. Typically, a reflective sheet for reflecting light upward is positioned below the optical lens, and a diffusion plate for more uniformly distributing light is positioned above the optical lens.

SUMMARY OF THE DISCLOSURE

One purpose of the present disclosure is to provide a backlight unit capable of preventing the lifting of a reflective sheet.

Another purpose of the present disclosure is to provide a display device capable of preventing the lifting of a reflective sheet.

The technical problems and limitations to be overcome in this document are not limited to the above-mentioned technical problems and limitations. Other technical problems and limitations not mentioned can be clearly understood from those described below by a person having ordinary skill in the art.

One embodiment of the present disclosure provides a backlight unit including: a bottom chassis; a light source configured to be disposed on the bottom chassis; a reflective sheet configured to be disposed on the bottom chassis; an optical sheet configured to be disposed on the light source; supports configured to be disposed between the bottom chassis and the optical sheet, to support the optical sheet, and to be spaced apart from each other; and a wire portion configured to connect the supports adjacent to each other.

Another embodiment of the present disclosure provides a display device including: a display panel; and a backlight unit configured to provide light to the display panel. The backlight unit includes: a bottom chassis; a light source configured to be disposed on the bottom chassis; a reflective sheet configured to be disposed on the bottom chassis; an optical sheet configured to be disposed on the light source; supports configured to be disposed between the bottom chassis and the optical sheet, to support the optical sheet, and to be spaced apart from each other; and a wire portion configured to connect the supports adjacent to each other. The support includes a fastening portion that is fastened to the bottom chassis, a support portion that contacts the optical sheet, a body portion that is placed between the fastening portion and the support portion, and a connecting portion that is placed between the body portion and the fastening portion. The reflective sheet is disposed between the fastening portion and the body portion and between the bottom chassis and the body portion. The wire portion is disposed between the reflective sheet and the body portion.

Further another embodiment of the present disclosure provides a backlight unit including: a bottom chassis; a light source configured to be disposed on the bottom chassis; a reflective sheet configured to be disposed on the bottom chassis; an optical sheet configured to be disposed on the light source; supports configured to be disposed between the bottom chassis and the optical sheet, to support the optical sheet, and to be spaced apart from each other; and a bridge configured to connect the supports adjacent to each other.

Yet another embodiment the present disclosure provides a display device including: a display panel; and a backlight unit configured to provide light to the display panel. The backlight unit includes: a bottom chassis; a light source configured to be disposed on the bottom chassis; a reflective sheet configured to be disposed on the bottom chassis; an optical sheet configured to be disposed on the light source; supports configured to be disposed between the bottom chassis and the optical sheet, to support the optical sheet, and to be spaced apart from each other; and a bridge configured to connect the supports adjacent to each other. The support includes a fastening portion that is fastened to the bottom chassis, a support portion that contacts the optical sheet, and a body portion that is placed between the fastening portion and the support portion. The reflective sheet is disposed between the fastening portion and the body portion and between the bottom chassis and the body portion. The bridge is disposed between the reflective sheet and the body portion.

Other details of the embodiments of the present disclosure are included in the detailed description and drawings.

According to the backlight unit and the display device including the same according to the embodiments of the present disclosure, since the body portion of the support that supports the optical sheet has a cross-sectional shape of the closed loop, the body portion can have a restoring force against the bending of the optical sheet.

In addition, the body portion can have elasticity to have the restoring force against the bending of the optical sheet.

Further, image visibility can be reduced by reducing the thickness of the support portion of the support.

Advantageous effects according to the embodiments of the present disclosure are not limited by the foregoing description. More various effects are included in this specification.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
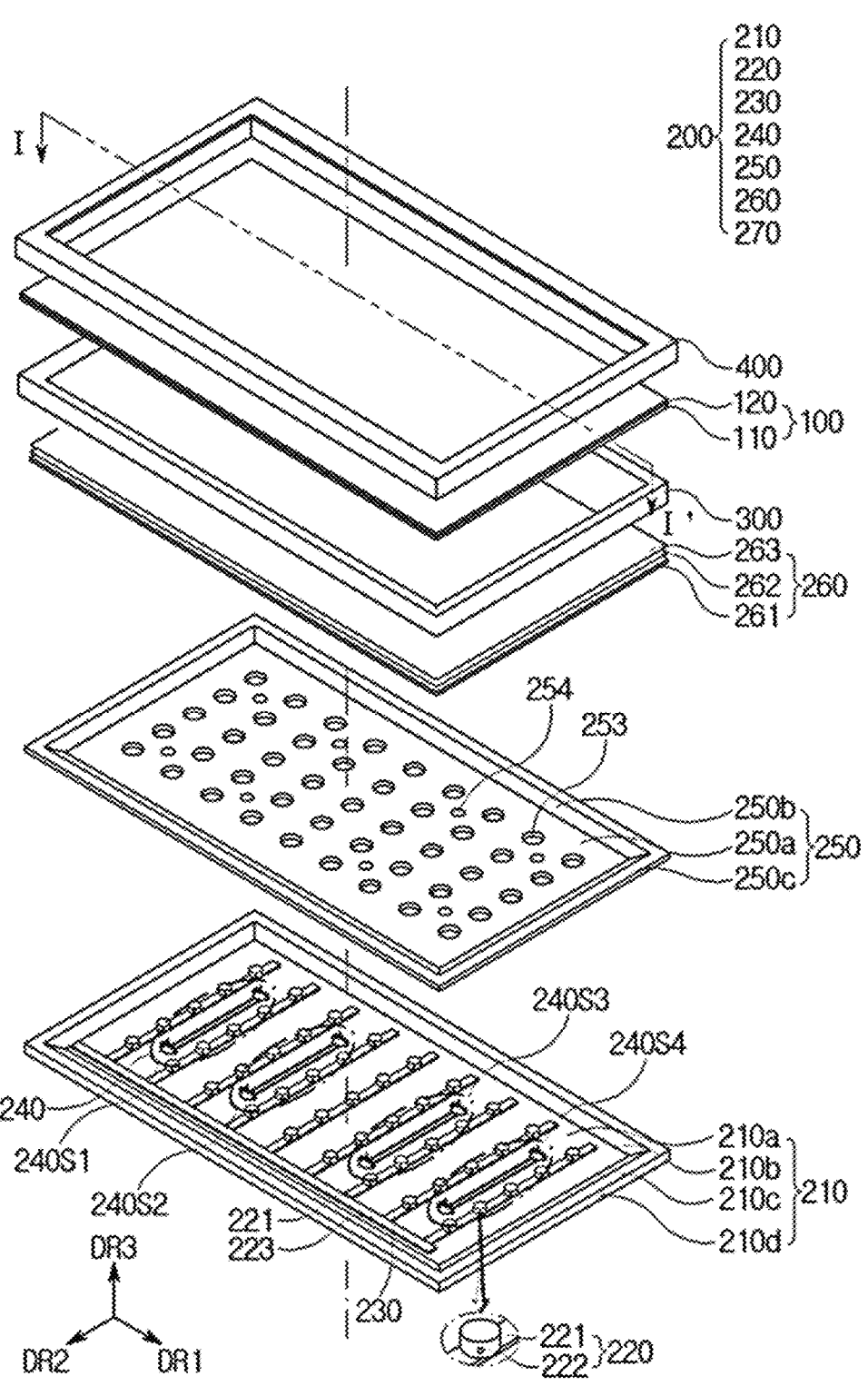
FIG. 1 is an exploded perspective view of a liquid crystal display device including a backlight unit according to an embodiment of the present disclosure.

The features, advantages and method for accomplishment of the present disclosure will be more apparent from referring to the following detailed embodiments described as well as the accompanying drawings. However, the present disclosure is not limited to the embodiment to be disclosed below and is implemented in different and various forms. The embodiments bring about the complete disclosure of the present disclosure and are only provided to make those skilled in the art fully understand the scope of the present disclosure. The present disclosure is just defined by the scope of the appended claims.

What an element or layer is referred to as being "on," "over," "above," "under," "below," etc. another an element or layer includes both a case where an element or layer is just on or under another element or layer and a case where one or more elements or layers are interposed between them.

The same reference numerals throughout the disclosure correspond to the same elements. Since the shapes, sizes, proportions, angles, numbers, etc., disclosed in the drawings for describing the embodiments of the present disclosure are illustrative, the present disclosure is not limited to the shown details.

While terms such as the first and the second, etc., can be used to describe various components, the components are not limited by the terms mentioned above. The terms are used only for distinguishing between one component and other components, and may not define order or sequence. Therefore, the first component to be described below can be the second component within the spirit of the present disclosure.

The features of the various embodiments of the present disclosure can be partially or entirely coupled to or combined with each other, and the features can be technically and variously connected and driven. Further, the embodiments can be implemented independently of each other or together in an association relationship.

Hereinafter, specific embodiments of the present disclosure will be described with reference to the accompanying drawings. All the components of each display device or apparatus according to all embodiments of the present disclosure are operatively coupled and configured. Further, in the present application, the examples of backlight units coupled with various liquid crystal display devices are discussed. However, such backlight units can be used in or with other devices/apparatuses or electronic modules.

Figure 2:
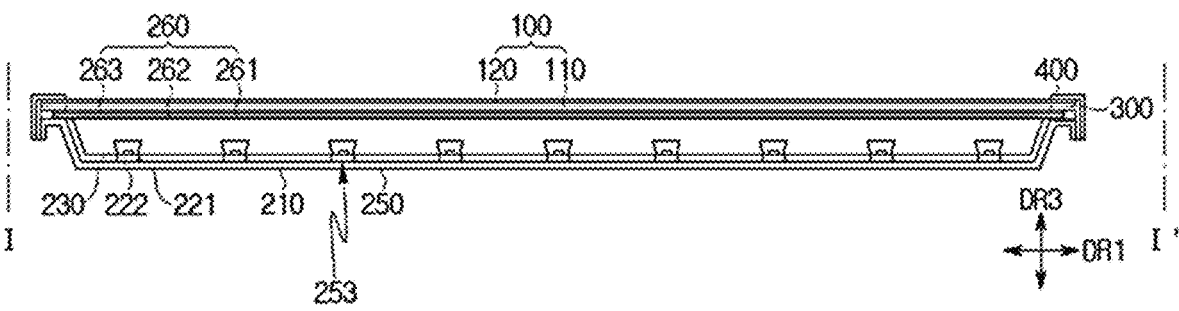
FIG. 2 is a cross-sectional view taken along line I-I' of FIG. 1.

FIG. 1 is an exploded perspective view of a liquid crystal display device including a backlight unit according to an embodiment of the present disclosure. FIG. 2 is a cross-sectional view taken along line I-I' of FIG. 1.

Referring to FIGS. 1 and 2, the liquid crystal display device includes a liquid crystal display panel 100 and a backlight unit 200. The backlight unit 200 supplies light to the liquid crystal display panel, and the liquid crystal display panel 100 controls the supplied light to display an image. The liquid crystal display device further includes a mold frame 300 positioned between the liquid crystal display panel 100 and the backlight unit 200. The liquid crystal display device further includes a top chassis 400 for protecting the liquid crystal display panel 100 by surrounding a rim of the liquid crystal display panel 100 and for preventing the liquid crystal display panel 100 from being separated from the backlight unit 200. Any one or both of the mold frame 300 and the top chassis 400 can be omitted according to the embodiment.

The liquid crystal display panel 100 includes a lower display substrate 110, an upper display substrate 120, and a liquid crystal layer. The lower display substrate 110 and the upper display substrate 120 are bonded to each other at a predetermined interval, and the liquid crystal layer can be formed between them.

The lower display substrate 110 can include a transparent insulating substrate such as glass, and a plurality of thin film transistors, data lines, gate lines, pixel electrodes, and the like formed on the transparent insulating substrate. The data line can be connected to a source terminal of the thin film transistor, and the gate line can be connected to a gate terminal of the thin film transistor. The pixel electrode made of a transparent conductive material such as indium tin oxide (ITO) can be connected to a drain terminal of the thin film transistor.

The upper display substrate 120 positioned to face the lower display substrate 110 can include a transparent insulating substrate and a color filter, a common electrode, etc., formed on the transparent insulating substrate. The color filter can include color filters capable of representing primary colors such as red, green, blue, etc., respectively. The common electrode can be formed of a transparent conductive material such as indium tin oxide (ITO) or indium zinc oxide (IZO). At least one of the color filter and the common electrode can be positioned on the lower display substrate 110.

A polarizer can be attached to each of the lower display substrate 110 and the upper display substrate 120. The polarizer can serve to polarize light incident on the liquid crystal display panel 100 and to transmit only light vibrating in one direction.

In the liquid crystal display panel 100, when the thin film transistor is turned on by a signal applied to the gate line, a signal applied to the data line is applied to the pixel electrode. Then, an electric field having a predetermined magnitude is formed between the pixel electrode and the common electrode to control the orientation of liquid crystal molecules in the liquid crystal layer. Accordingly, an image is displayed by controlling the transmittance of light passing through the liquid crystal layer.

The liquid crystal display device can include at least one driving device such as a driver and a controller that control a signal applied to the liquid crystal display panel 100. The driving device can be mounted on the liquid crystal display panel 100 in the form of an integrated circuit chip or mounted on a printed circuit board (PCB) or a flexible printed circuit board (FPCB), and thus, can be electrically connected to the liquid crystal display panel 100. Some driving devices can be integrated into the liquid crystal display panel 100.

The backlight unit 200 can be positioned below the liquid crystal display panel 100 in order to provide light to the liquid crystal display panel 100.

The backlight unit 200 can include a bottom chassis 210, a light source unit 220 that is received or fixed to the bottom chassis 210 or is supported by the bottom chassis 210, an optical lens 230, and a support 240, a reflective sheet 250, an optical sheet 260, and a wire portion 270.

The bottom chassis 210 can have an open top and a receiving space having a predetermined depth. The bottom chassis 210 can include a bottom 210a, a wing 210b extending substantially obliquely upwardly around the bottom 210a, a rim 210c extending substantially horizontally outwardly from an upper end of the wing 210b, and a wall 210d extending downwardly from the rim 210c. The bottom 210a can include a substantially flat base 211 (see FIG. 5), a recess 212 (see FIG. 5) below the base 211 (the other side of a third direction DR3), and a wall 213 (see FIG. 5) between the base 211 and the recess 212.

The bottom chassis 210 can be made of a metal material such as an aluminum plate, an aluminum alloy plate, a galvanized steel plate, etc. According to the embodiment, the bottom chassis 210 can be made of a plastic material such as polycarbonate (PC).

The light source unit 220 is received in the bottom chassis 210. The light source unit 220 includes a substrate 221 and a plurality of light sources 222 mounted on the substrate 221. The light source unit 220 can be positioned on the bottom 210a of the bottom chassis 210. The light source unit 220 can be positioned on the base 211 of the bottom 210a of the bottom chassis 210. The light source 222 can be a light emitting diode (LED) package, and is mounted on the circuit board 221 such that a light emitting surface of the LED package faces the liquid crystal display panel 100. A white LED package emitting white light can be used as the LED package, or red, green, and blue LED packages can be mixed and arranged to be used as the LED package. In addition to the LED package, other possible point light source or linear light source can be used as the light source 222.

The substrate 221 can extend in a second direction DR2. The substrate 221 can have a bar shape extending in the second direction DR2. The plurality of light sources 222 can be mounted on one substrate 221. As shown in FIG. 1, a plurality of the substrates 221 can be provided, and the plurality of substrates 221 can be arranged to be spaced apart from each other in a first direction DR1. In examples, the directions DR1, DR2, DR3 are perpendicular or substantially perpendicular to each other. The substrate 221 supports the light source 222 and supplies power to the light source 222. The substrate 221 can be a circuit board, and in particular, can be a metal core printed circuit board (MCPCB) capable of quickly radiating heat generated by the light source 222. The light source 222 can be supplied with electric power by being electrically connected to the wiring of the substrate 221 and can convert electrical energy into light energy and emit it.

The optical lens 230 can be mounted on the substrate 221. The optical lens 230 can be arranged in each light source 222, and the optical lens 230 overlapping the light source 222 in a thickness direction is arranged to cover the light source 222. The light that is hereby emitted from the light source 222 can be refracted and diffused through the optical lens 230. Since the optical lens 230 diffuses the upward traveling light of the light source 222 in order for the light not to be focused, the use of the optical lens 230 can reduce the number of light sources 222 and apply a high-power light source.

The optical lens 230 can be a side emitting lens that refracts and diffuses the upward traveling light of the light source 222 mainly in a lateral direction. Meanwhile, the optical lens 230 can be a top emitting lens that refracts and diffuses the light from the light source 222 mainly in an upward direction. Since the side emitting lens can reduce an optical distance compared to the top emitting lens, the optical sheet 260 to be described later can be positioned closer to the light source, and thus, the total thickness of the backlight unit 200 can be reduced, thereby being advantageous for thinning the liquid crystal display device.

As shown, when a plurality of light source assemblies is disposed, the light source unit 220 can further include one or a plurality of connecting boards 223 to supply power to each light source assembly. The plurality of light source assemblies can be coupled to the connection board 223, and, for example, like a plug, an end portion of the substrate 221 can be inserted into and coupled to an insertion hole of the connection board 223. In some embodiments, an electric wire can be used instead of the connecting board 223 to supply power to the light source assembly.

The support 240 can be disposed between the bottom chassis 210 and the optical sheet 260. The support 240 can be fastened to the bottom chassis 210 and can support the optical sheet 260. The support 240 can come into direct contact with the optical sheet 260. A plurality of the support 240 can be provided. The plurality of supports 240 can be disposed between adjacent planar substrates 221. As shown in FIGS. 1 and 2, the supports 240 are not disposed between all adjacent substrates 221, and can be disposed only between some adjacent substrates 221 and may not be disposed between other adjacent substrates 221. However, the support 240 is not limited thereto.

Hereinafter, the supports 240 arranged in the second direction DR2 are referred to as support sets 240S1 to 240S4.

For example, one of the support sets (e.g., the first support set 240S1) can be disposed between the substrate 221 disposed adjacent to the wall 210d extending in the second direction DR2 on the other side of the first direction DR1 on a plane and a substrate 221 adjacent to the substrate 221 on one side of the first direction DR1. Another support set (e.g., the second support set 240S2) can be spaced apart from the above-mentioned one support set such that the substrate 221 disposed adjacent to the wall 210d extending in the second direction DR2 on the other side of the first direction DR1 on a plane, the substrate 221 adjacent to the substrate 221 on one side of the first direction DR1, and a substrate 221 adjacent to the substrate 221 on one side of the first direction DR1 are placed between them. However, without being limited to this, the above-described another support set can be spaced apart from the one support set with the one substrate 221 placed therebetween. Otherwise, the above-described another support set can be spaced apart from the above-mentioned one support set such that three or more substrates 221 are placed between them.

Furthermore, further another support set (e.g., the third support set 240S3) can be disposed between the substrate 221 disposed adjacent to the wall 210d extending in the second direction DR2 on one side of the first direction DR1 on a plane and a substrate 221 adjacent to the substrate 221 on the other side of the first direction DR1. Further another support set (e.g., the fourth support set 240S4) can be spaced apart from the above-described another support set (e.g., the third support set 240S3) such that the substrate 221 disposed adjacent to the wall 210d extending in the second direction DR2 on one side of the first direction DR1 on a plane, the substrate 221 adjacent to the substrate 221 on the other side of the first direction DR1, and a substrate 221 adjacent to the substrate 221 on the other side of the first direction DR1 are placed between them. However, without being limited to this, the above-described another support set (e.g., the fourth support set 240S4) can be spaced apart from the above-described another support set (e.g., the third support set 240S3) with the one substrate 221 placed therebetween. Otherwise, the above-described another support set (e.g., the fourth support set 240S4) can be spaced apart from the above-described another support set (e.g., the third support set 240S3) such that three or more substrates 221 are placed between them.

In addition, as shown in FIG. 1, only two supports 240 are disposed between some adjacent substrates 221. However, the support is not limited thereto. One or more than three supports 240 can be disposed between some adjacent substrates 221.

The wire portion 270 can connect the adjacent supports 240.

The wire portion 270 can be provided in the plural form. For example, the wire portion 270 can connect the two adjacent supports 240.

For example, the plurality of wire portions 270 can connect the first support set and the second support set, and can connect the third support set and the fourth support set. Since FIG. 1 shows the support set is two each, there can be two wire portions 270 that connect the first support set and the second support set which are adjacent in the first direction DR1, and there can be two wire portions 270 that connect the third support set and the fourth support set which are adjacent to in the first direction DR1.

The reflective sheet 250 can be placed on the bottom chassis 210. The reflective sheet 250 serves to increase light efficiency by reflecting the light coming from the optical lens 230 and the light reflected from other structures such as a diffusion plate 261 and by ultimately directing the light toward the liquid crystal display panel 100.

The reflective sheet 250 can have a structure that is entirely seated as a whole on the inner surface of the bottom chassis 210. For example, in correspondence to the bottom 210a, the wing 210b, and the rim 210c of the bottom chassis 210, the reflective sheet 250 can include a flat portion 250a, a wing 250b, and a rim 250c. The wing 250b extends substantially obliquely upward from the perimeter of the flat portion 250a. The rim 250c extends substantially horizontally from the wing 250b. The reflective sheet 250 can be made of a plastic material such as polyethylene terephthalate (PET), polycarbonate (PC), or polystyrene (PS). The reflective sheet 250 can include a light reflective material such as titanium dioxide (TiO2) in order to increase light reflectance.

Figure 4:
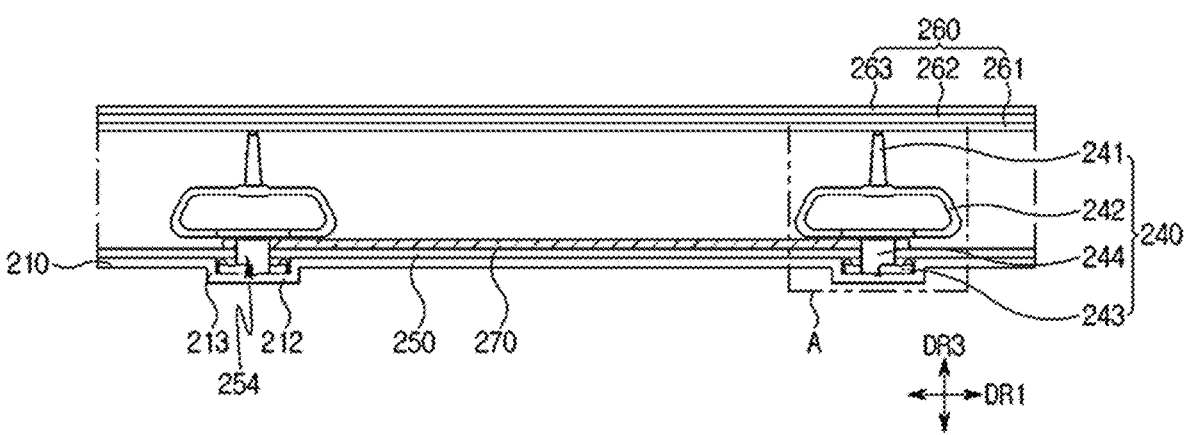
FIG. 4 is a cross sectional view showing a bottom chassis, a reflective sheet, the wire portion, the support, and an optical sheet of the liquid crystal display device of FIG. 1.

The flat portion 250a of the reflective sheet 250 has a first hole 253 and a second hole 254. The first hole 253 allows the optical lens 230 to pass therethrough. The second hole 254 allows a support portion 241 of the support 240 to pass therethrough. Accordingly, as shown in FIGS. 2 and 4 to be described later, when the reflective sheet 250 is seated on the bottom chassis 210, the optical lens 230 can be exposed upward from the reflective sheet 250 through the first hole 253, and the support portion 241 can be exposed upward from the reflective sheet 250 through the second hole 254.

The shape of the first hole 253 can correspond to the horizontal cross-sectional shape of the optical lens 230 and can be, for example, circular. The size of the first hole 253 can be enough for the thickest portion (i.e., the portion with the largest transverse cross-sectional area) of the optical lens 230 to pass therethrough.

The shape of the second hole 254 can correspond to the horizontal cross-sectional shape of the support portion 241. For example, if the horizontal cross-sectional shape of the support portion 241 is circular, the shape of the second hole 254 can also be circular, and if the horizontal cross-sectional shape of the support portion 241 is quadrangular, the shape of the second hole 254 can also be quadrangular. The size of the second hole 254 can be enough for the thickest portion of the support portion 241 to pass therethrough. For example, when the horizontal cross-sectional shapes of the second hole 254 and the support portion 241 are circular, the inner diameter of the second hole 254 can be the same as or almost the same as the outer diameter of the thickest portion of the support portion 241.

Figure 3:
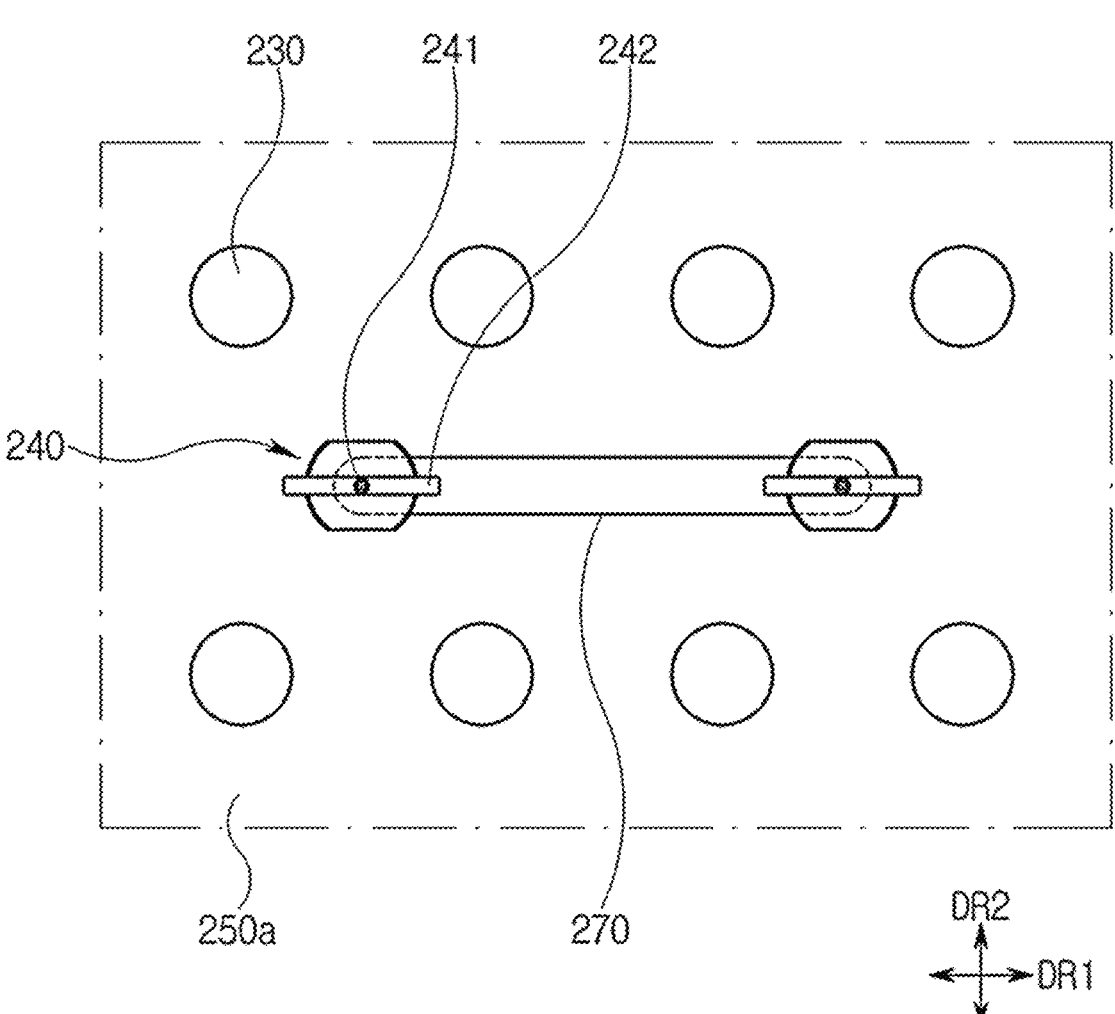
FIG. 3 is a plan view showing an optical lens, a support, and a wire portion according to the embodiment of the present disclosure.
Figure 5:
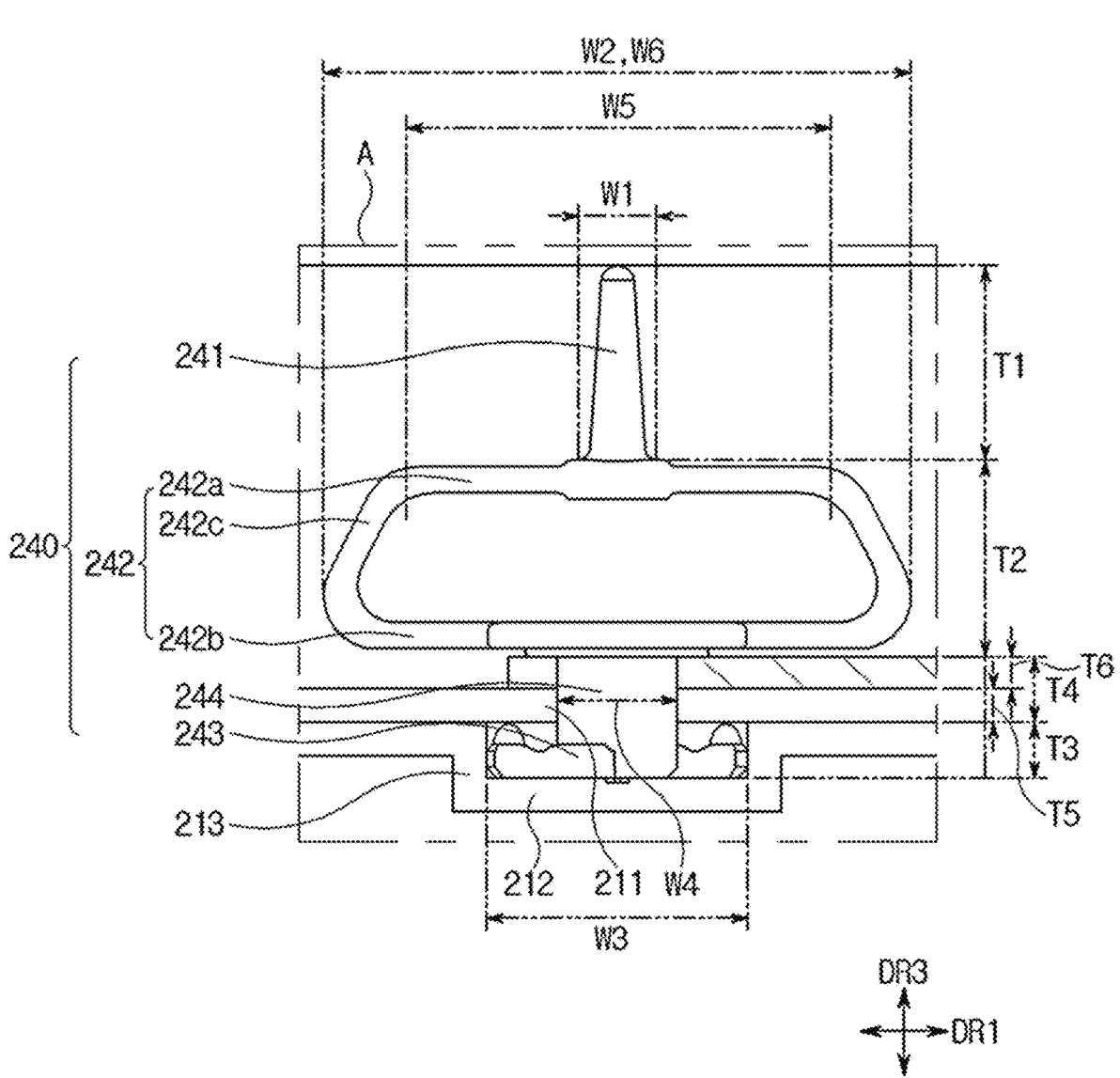
FIG. 5 is an enlarged cross-sectional view of a region "A" of FIG. 4.
Figure 6:
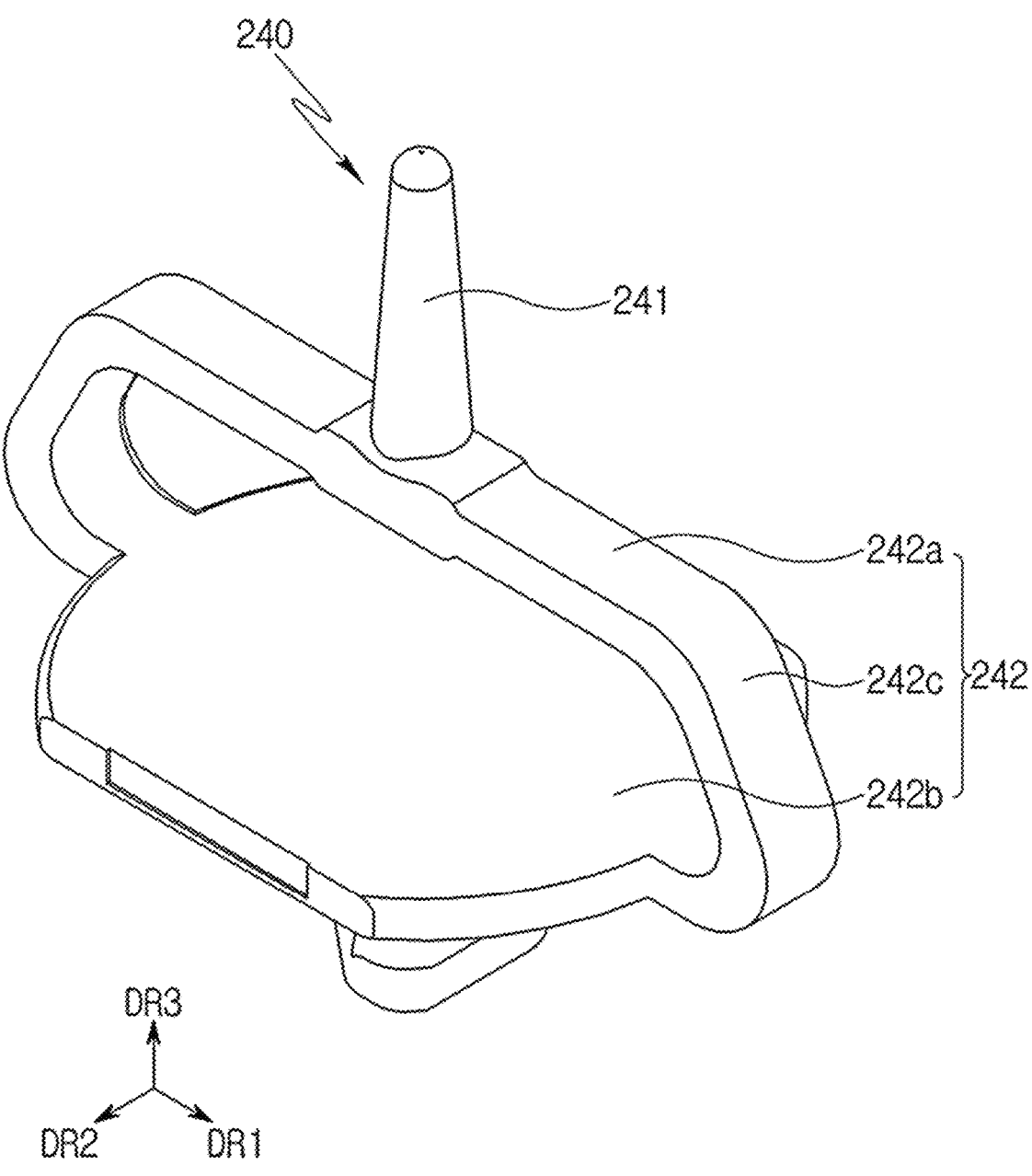
FIG. 6 is a perspective view of the support of FIG. 3.
Figure 7:
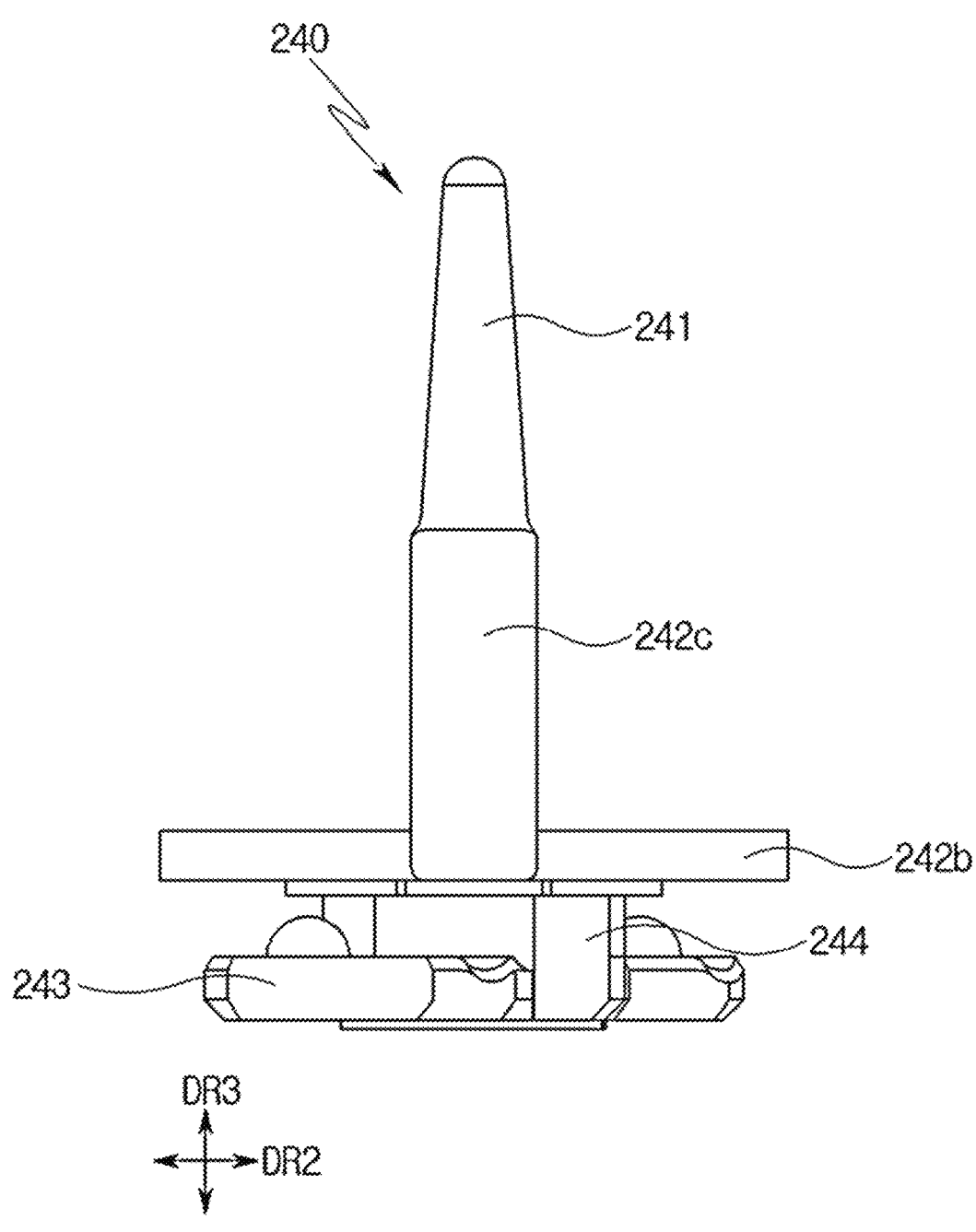
FIG. 7 is a side view of the support of FIG. 5.
Figure 8:
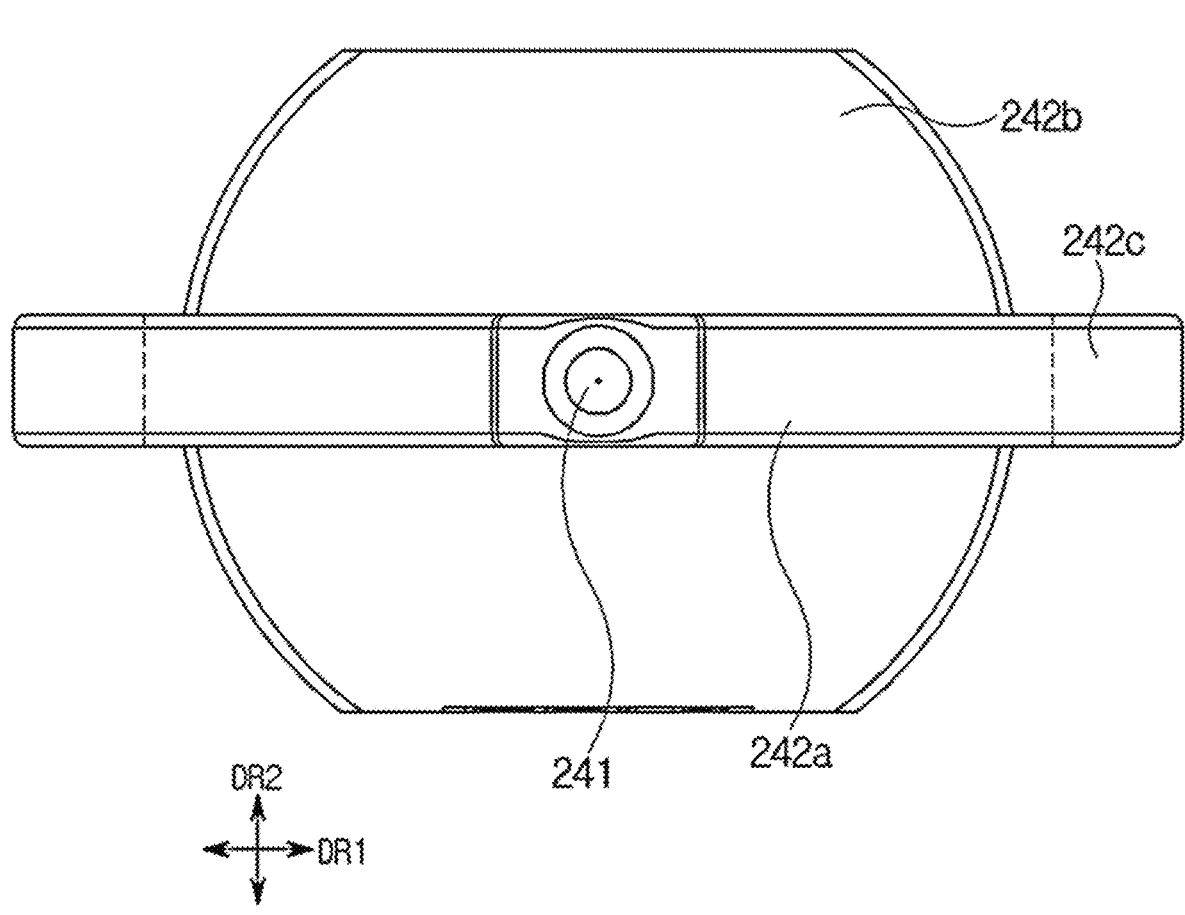
FIG. 8 is a plan view of the support of FIG. 5.
Figure 9:
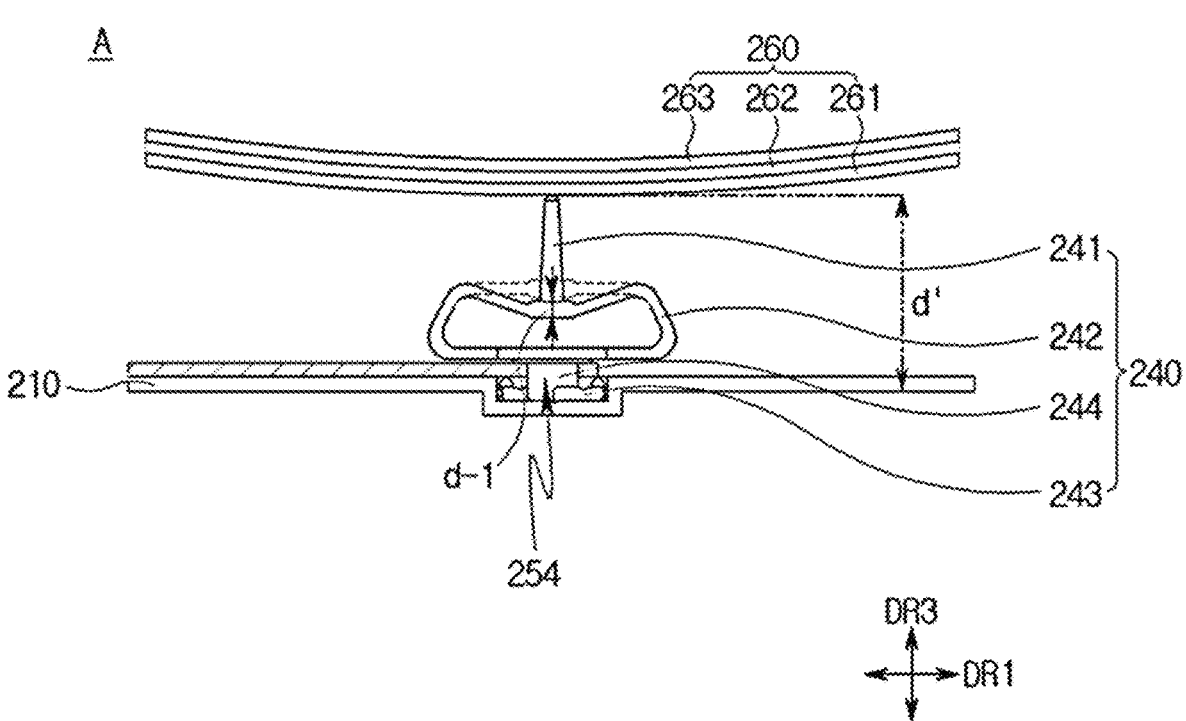
FIG. 9 is a mimetic diagram for describing a restoring function of the support according to the embodiment of the present disclosure.

FIG. 3 is a plan view showing the optical lens, the support, and the wire portion according to the embodiment. FIG. 4 is a cross sectional view showing the bottom chassis, the reflective sheet, the wire portion, the support, and the optical sheet of the liquid crystal display device of FIG. 1. FIG. 5 is an enlarged cross-sectional view of a region "A" of FIG. 4. FIG. 6 is a perspective view of the support of FIG. 3. FIG. 7 is a side view of the support of FIG. 5. FIG. 8 is a plan view of the support of FIG. 5. FIG. 9 is a mimetic diagram for describing a restoring function of the support according to the embodiment of the present disclosure.

Referring to FIGS. 3 to 8, the support 240 can be surrounded by four optical lenses 230, on a plane. In FIG. 3, one support 240 of the first support set and one support 240 of the second support set are shown.

For example, one support 240 of the first support set can be disposed between the optical lens 230 positioned on one side of the first direction DR1 and on the other side of the second direction DR2 and the optical lens 230 positioned on the other side of the first direction DR1 and on one side of the second side DR2, and between the optical lens 230 positioned on the other side of the first direction DR1 and on the other side of the second direction DR2 and the optical lens 230 positioned on one side of the first direction DR1 and on one side of the second side DR2. One support 240 of the second support set can also be disposed between the optical lens 230 positioned on one side of the first direction DR1 and on the other side of the second direction DR2 and the optical lens 230 positioned on the other side of the first direction DR1 and on one side of the second side DR2, and between the optical lens 230 positioned on the other side of the first direction DR1 and on the other side of the second direction DR2 and the optical lens 230 positioned on one side of the first direction DR1 and on one side of the second side DR2.

The wire portion 270 can connect one support 240 of the first support set 240S1 and one support 240 of the second support set 240S2.

Since the support 240 is arranged on a plane in such a way as to be surrounded by four optical lenses 230 which are located in a diagonal direction each, the wire portion 270 connecting the adjacent supports 240 is disposed so as not to overlap the optical lens 230 in the thickness direction. In other words, there may not occur physical interference between the wire portion 270 and the optical lens 230. Since the optical lens 230 overlaps the light source 222 and the substrate 221 of the light source unit 220 in the thickness direction, the wire portion 270 may not overlap the light source 222 and the substrate 221 in the thickness direction, respectively, and physical interference may not occur. In the embodiment, the wire portion 270 can connect two supports 240 on a plane, and can form a closed loop that connects two adjacent planar supports 240.

As shown in FIG. 4, the bottom chassis 210 and the optical sheet 260 can be spaced apart from each other at a predetermined distance.

The support 240 can be made of plastic such as polycarbonate or of metal, and can be formed as a single component. In order to minimize scattering and reflection of light by the support 240, the support 240 can be coated with an optical material such as a light absorbing material.

The support 240 can include the support portion 241, a body portion 242, a fastening portion 243, and a connecting portion 244.

The support portion 241 can extend in the third direction DR3 and can directly contact the optical sheet 260. The support portion 241 can have a first thickness T1 in the third direction DR3 and can have a first width W1 in the first direction DR1.

In order to minimize light scattering and reflection of light by the support portion 241, the support portion 241 can have a thin and elongated column shape (e.g., a cylinder shape, a polygonal column shape), and can have a shape in which the cross-sectional area decreases toward the top thereof. while FIG. 4 shows the support portion 241 has a conical shape, the support portion 241 is not limited thereto. The support portion 241 can have a polygonal pyramid shape such as a triangular pyramid or a quadrangular pyramid. However, since an end portion of the support portion 241 comes into contact with the optical sheet 260, the end of the support portion 241 can be formed to be rounded or flat so as not to damage the optical sheet 260.

The body portion 242 can be disposed between the support portion 241 and the fastening portion 243. The body portion 242 can have the second thickness T2 in the third direction DR3 and can have a second width W2 in the first direction DR1. The body portion 242 is disposed below the support portion 241 and is designed to have a structure that allows the body portion 242 to have a restoring force, so that the optical sheet 260 can be prevented in advance from being bent by its own weight. The above-described structure that allows the body portion 242 to have a restoring force will be described later.

The fastening portion 243 can be disposed between the body portion 242 and the bottom chassis 210. The fastening portion 243 can be a portion of the support 240 which is fastened to the bottom chassis 210. A bottom surface of the fastening portion 243 is fastened to the bottom chassis 210. Examples of a fastening method between the fastening portion 243 and the bottom chassis 210 include soldering, bolt-nut, an adhesive, or the like, are not limited thereto. The fastening portion 243 can have the third thickness T3 in the third direction DR3 and can have a third width W3 in the first direction DR1. The fastening portion 243 can be disposed on the recess 212 of the bottom chassis 210. The fastening portion 243 is fastened to the recess 212 and can contact with the wall 213, but is not limited thereto. While FIG. 4 shows that the top surface of the fastening portion 243 is on the same line with the bottom surface of the base 211, but the present disclosure is not limited thereto.

The connecting portion 244 can be disposed between the fastening portion 243 and the body portion 242. The connecting portion 244 can connect the fastening portion 243 and the body portion 242. The connecting portion 244 can have a fourth thickness T4 in the third direction DR3 and a fourth width W4 in the first direction DR1.

In the embodiment, the first width W1 can be less than the second and third widths W2 and W3, and the second width W2 can be larger than the third width W3. Further, the fourth width W4 can be larger than the first width W1 and can be less than the third width W3.

The body portion 242 can include a plurality of components. The body portion 242 includes a first portion 242a which extends in the first direction DR1, a second portion 242b which disposed below the first portion 242a and extends in the first direction DR1, and a third portion 242c which connects the first portion 242a and the second portion 242b. A plurality of the third portion 242c can be provided. One third portion 242c of the plurality of third portions 242c can connect the other side end of the first portion 242a in the first direction DR1 and the other side end of the second portion 242b in the first direction DR1, and another third portion 242c can connect one side end of the first portion 242a in the first direction DR1 and one side end of the second portion 242b in the first direction DR1.

The first portion 242a, the second portion 242b, and the third portion 242c can have a predetermined width, respectively. In FIG. 5, the predetermined width of a central portion of the first portion 242a (or a portion of the first portion 242a that contacts the support portion 241) can be larger than the predetermined width of the other portions.

The first portion 242a and the second portion 242b can be spaced apart from each other in the third direction DR3, and the plurality of third portions 242c can be spaced apart from each other. For example, a cross-sectional shape formed by the first portion 242a, the second portion 242b, and the third portion 242c can be a closed loop shape.

The first portion 242a can have a fifth width W5, and the second portion 242b can have a sixth width W6. The fifth width W5 can be less than the sixth width W6. For example, the cross-sectional shape of the closed loop formed by the first portion 242a, the second portion 242b, and the third portion 242c can be substantially a trapezoidal outline shape. However, the present disclosure is not limited thereto, and the cross-sectional shape of the closed loop formed by the first portion 242a, the second portion 242b, and the third portion 242c can be an inverted trapezoidal outline shape. In some embodiments of the present disclosure, the body portion 242 can have circular, elliptical, or other polygonal cross-sectional shapes.

According to the embodiment, as described above, the first portion 242a and the second portion 242b are spaced apart from each other in the third direction DR3, and the plurality of third portions 242c are spaced apart from each other, so that the cross-sectional shape formed by the first portion 242a, the second portion 242b, and the third portion 242c can be a closed loop shape. When the optical sheet 260 is bent downward (to the other side of the third direction DR3) by the weight of the optical sheet 260, the weight of the optical sheet 260 can be transferred to the body portion 242 through the support portion 241 which directly contacts the optical sheet. As in the embodiment, since the first portion 242a and the second portion 242b of the body portion 242 are spaced apart from each other, even though the optical sheet 260 is bent downward, the cross-sectional shape of the closed loop of the body portion 242 below the support portion 241 allows the first portion 242a to be momentarily bent downward like the cross-sectional shape of the optical sheet 260 and to bear the weight of the optical sheet 260. This will be described with reference to FIG. 9.

As shown in FIG. 9, when the optical sheet 260 is bent downward, the first portion 242a is momentarily bent downward like the cross-sectional shape of the optical sheet 260, thereby bearing the weight of the optical sheet 260. When the optical sheet 260 is bent downward, a distance "d'" between the optical sheet 260 and the bottom chassis 210 can be smaller than the distance before the optical sheet 260 is bent downward. Further, when the optical sheet 260 is bent downward, the first portion 242a is momentarily bent downward like the cross-sectional shape of the optical sheet 260, so that the central portion of the first portion 242a can be bent downward by a predetermined length (d–1).

The first portion 242a of the body portion 242 has a restoring force and raises upward again the optical sheet 260 that is bent downward while returning to its original shape (a shape extending in the first direction DR1) again.

In the embodiment, in order that the first portion 242a of the body portion 242 has a restoring force and raises upward again the optical sheet 260 that is bent downward while returning to its original shape (a shape extending in the first direction DR1) again, the body portion 242 can include an elastic material. For example, an elastic force of the body portion 242 can be greater than that of the support portion 241. In other words, the support portion 241 and the fastening portion 243 of the support 240 can be made of plastic material such as the aforementioned polycarbonate or can be made of metal each. The body portion 242 can be made of a material having a greater elastic force than those of the support portion 241 and the fastening portion 243.

As described above, as in the embodiment, when the first portion 242a is momentarily bent downward like the cross-sectional shape of the optical sheet 260 and bears the weight of the optical sheet 260 and the first portion 242a of the body portion 242 has a restoring force and raises upward again the optical sheet 260 that is bent downward while returning to its original shape (a shape extending in the first direction DR1) again, only the first portion 242a of the body portion 242 can include an elastic material, and the second portion 242b and the third portion 242c of the body portion 242 may not include an elastic material. For example, an elastic force of the first portion 242a can be greater than an elastic force of the second portion 242b and an elastic force of the third portion 242c, respectively. However, the body portion 242 is not limited thereto, and all the portions 242a, 242b, and 242c of the body portion 242 can include an elastic material.

Furthermore, when the optical sheet 260 is bent downward, in order for the first portion 242a to be momentarily sufficiently bent downward like the cross-sectional shape of the optical sheet 260, it is desirable that the above-described cross-sectional shape of the closed loop of the body portion 242 should have a sufficient area. To this end, it is preferable that the second width W2 of the body portion 242 should be greater than the first width W1 and the second thickness T2 is about 0.8 to about 1.2 times the first thickness T1. For example, the second width W2 of the body portion 242 can be within a range from about 5 to about 10 times of the first width W1. The second width W2 of the body portion 242 is more than about 5 times the first width W1, so that the body portion 242 can sufficiently bear the bending of the optical sheet 260. The second width W2 is less than or equal to about 10 times the first width W1, so that physical interference between the body portion 242 and an adjacent optical lens 230 can be minimized.

Furthermore, when the second thickness T2 of the body portion 242 is more than about 0.8 times the first thickness T1, the body portion 242 can sufficiently bear the bending of the optical sheet 260, and it is possible to minimize the visibility of the support portion 241 in the image by reducing the first thickness T1 of the support portion 241. The second thickness T2 is about 1.2 times or less than the first thickness T1, so that a minimum length of the support portion 241 that supports substantially the optical seat 260 can be secured.

The second portion 242b of the body portion 242 is connected to the fastening portion 243 which has a larger area than that of the support portion 241. Therefore, as shown in FIGS. 6, 7, and 8, it is desirable for the second portion 242b to have a larger area than that of the first portion 242a. The planar shape of the second portion 242b can be substantially a disk shape or a polygonal plate shape such as a quadrangular plate shape or a pentagonal plate shape. A width of the second portion 242b in the second direction DR2 can be greater than a width of the first portion 242a in the second direction DR2.

As shown in FIGS. 4 and 5, the reflective sheet 250 can be disposed between the fastening portion 243 and the body portion 242 and between the bottom chassis 210 and the body portion 242, and the wire portion 270 can be disposed between the reflective sheet 250 and the body portion 242.

The reflective sheet 250 can contact the fastening portion 243 and the bottom chassis 210, respectively. The reflective sheet 250 can contact with the top surface of the fastening portion 243 and the top surface of the bottom chassis 210, respectively. The upper portion of the reflective sheet 250 can come into direct contact with the wire portion 270.

The wire portion 270 can come into direct contact with the reflective sheet 250 thereunder and the body portion 242. The wire portion 270 can directly contact the second portion 242b of the body portion 242.

The wire portion 270 can connect the connecting portions 244 of the adjacent supports 240. The wire portion 270 can surround the connecting portions 244 of the adjacent supports 240, and the wire portion 270 can form a closed loop on a plane.

The reflective sheet 250 can have a fifth thickness T5, and the wire portion 270 can have a sixth thickness T6. The sum of the fifth thickness T5 and the sixth thickness T6 can be substantially equal to the fourth thickness T4 of the connecting portion 244. Since the sum of the fifth thickness T5 and the sixth thickness T6 is substantially equal to the fourth thickness T4 of the connecting portion 244, the lifting of the reflective sheet 250 can be prevented by that the reflective sheet 250 is fixed by the wire portion 270 thereon.

For example, when the light source unit 220 is received in the bottom chassis 210 and the light sources 222 of the light source unit 220 are driven and emit light, a predetermined heat can be radiated from the light sources 222 and the radiated heat can be transferred through the bottom chassis 210 to the reflective sheet 250 disposed on the bottom chassis 210. When the heat is provided to the reflective sheet 250, the reflective sheet 250 can be lifted from the bottom chassis 210. As described above, the reflective sheet 250 can serve to increase light efficiency by reflecting the light emitted from the optical lens 230 and light reflected by another structure such as a diffusion plate 261 and finally directing the light toward the liquid crystal display panel 100.

In the case where the reflective sheet 250 is lifted, when the light emitted from the optical lens 230 is reflected by the lifted reflective sheet 250, the reflected light does not reach an area overlapping the optical lens 230, resulting in the generation of a dark portion that is not visible on the screen.

However, in one embodiment, the wire portion 270 comes into direct contact with the top surface of the reflective sheet 250, thereby pressing the reflective sheet 250 that overlaps the wire portion 270 by a tension of the wire portion 270. Therefore, in the backlight unit of the one embodiment, it is possible to minimize the lifting of the reflective sheet 250.

Due to this configuration, it is possible to prevent in advance the dark portion that is generated by the lifting of the reflective sheet 250.

The wire portion 270 can be formed to have the fourth thickness T4. Any material capable of press the reflective sheet 250 that is below the wire portion 270 can be used as the material of the wire portion 270.

Furthermore, the wire portion 270 can include an optically transparent material. It is possible to prevent the wire portion 270 from being visible to the outside. For example, the transmittance of the wire portion 270 to visible light can be about 80% or more. For example, the wire portion 270 can include polyethylene (PE), but is not limited thereto.

The optical sheet 260 can be disposed over the bottom chassis 210 and the reflective sheet 250. Accordingly, the optical sheet 260 is positioned over the light source 222, the optical lens 230, and the support 240. An edge of the optical sheet 260 can be placed on the rim 210c (see FIG. 1) of the bottom chassis 210.

The optical sheet 260 can include the diffusion plate 261, a prism sheet 262, a protective sheet 263, etc. The diffuser plate 261 is used to obtain a surface light source with more uniform brightness by scattering the light. The prism sheet 262 is used to concentrate the light by adjusting the traveling direction of the light uniformly diffused by the diffusion plate 261, thereby increasing luminance. The protective sheet 263 is used to protect a prism of the prism sheet 262 from scratch or the like. The protective sheet 263 can also perform a function of widening a viewing angle narrowed by the prism sheet 262 by diffusing light.

The optical sheet 260 may not include any one of the prism sheet 262 and the protective sheet 263 and can include the other in plural. The optical sheet 260 can further include an optical sheet having other characteristics. For example, the optical sheet 260 can include a reflective polarizing sheet capable of increasing luminance efficiency by separating, transmitting, and reflecting polarization components of the light.

Meanwhile, an inverter board that is a printed circuit board for power supply and/or a printed circuit board for signal conversion can be mounted on a bottom surface of the bottom chassis 210. The inverter board can convert external power to a constant voltage level and provide the converted external power to the light source 222. The printed circuit board for signal conversion can convert an analog data signal into a digital data signal and provide it to the liquid crystal display panel 100 through a flexible circuit board attached to the liquid crystal display panel 100.

Referring back to FIGS. 1 and 2, the liquid crystal display device can include a mold frame 300 in order to stably fix the liquid crystal display panel 100 to the backlight unit 200 at a certain height. The mold frame 300 can be substantially a quadrangular frame having a rectangular parallelepiped shape with open top and bottom thereof. For example, the mold frame 300 can be fixed to the bottom chassis 210 in a manner of surrounding the rim 210c of the bottom chassis 210 and of being caught by and fixed to a hook that can be positioned on the wall 210d of the bottom chassis 210. Here, a portion of the mold frame 300 presses the edge of the optical sheet 260 placed on the rim 210c of the bottom chassis 210, so that movement of the optical sheet 260 can be limited. The liquid crystal display panel 100 is fixed on the mold frame 300. The liquid crystal display panel 100 can be attached to a flat surface of the mold frame 300 by an adhesive member. The adhesive member can be a cushion double-sided tape with buffering capacity in order to mitigate the impact that can be applied to the liquid crystal display panel 100.

Hereinafter, a liquid crystal display panel according to another embodiment of the present disclosure will be described.

Figure 10:
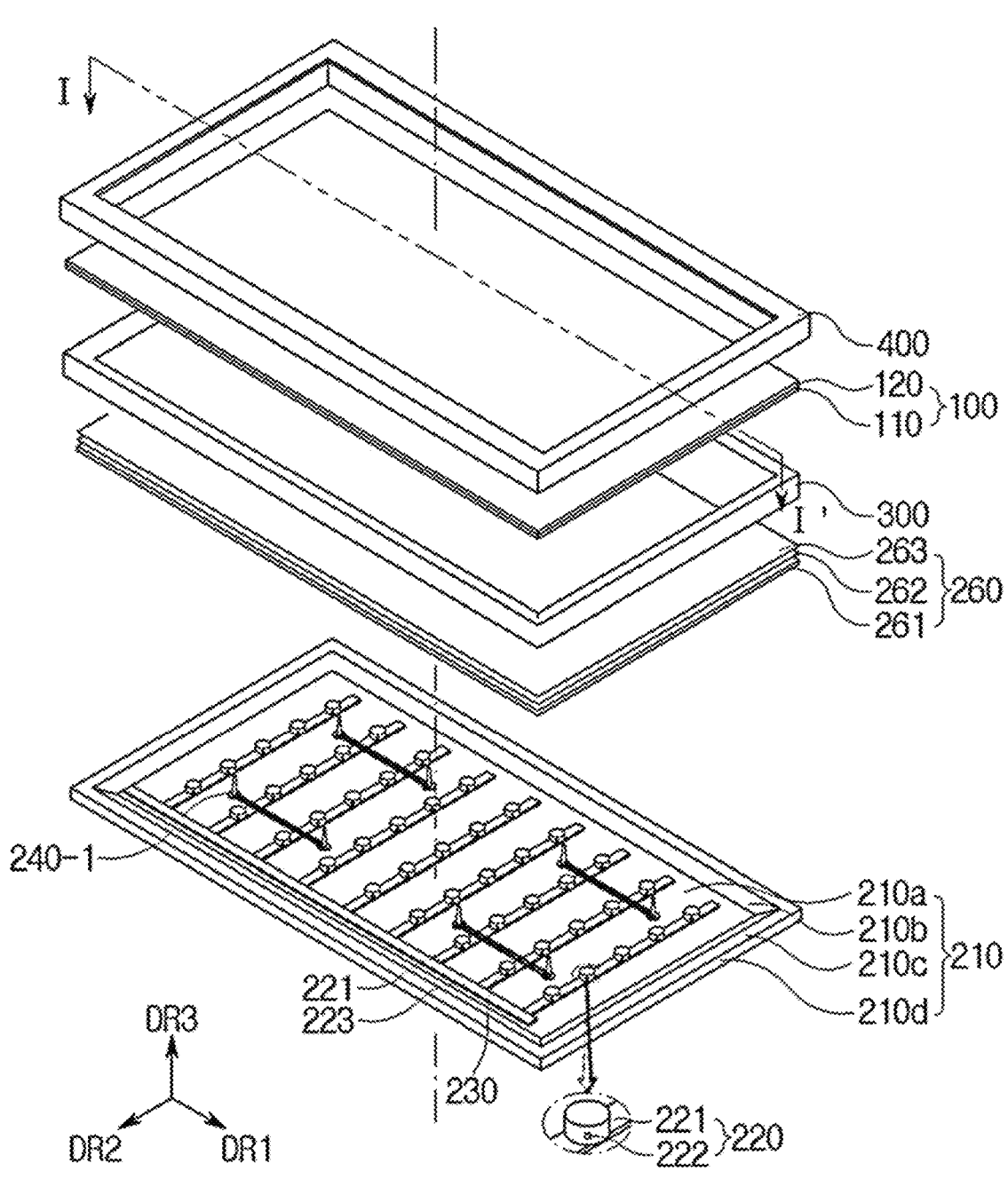
FIG. 10 is an exploded perspective view of a liquid crystal display device according to another embodiment of the present disclosure.
Figure 11:
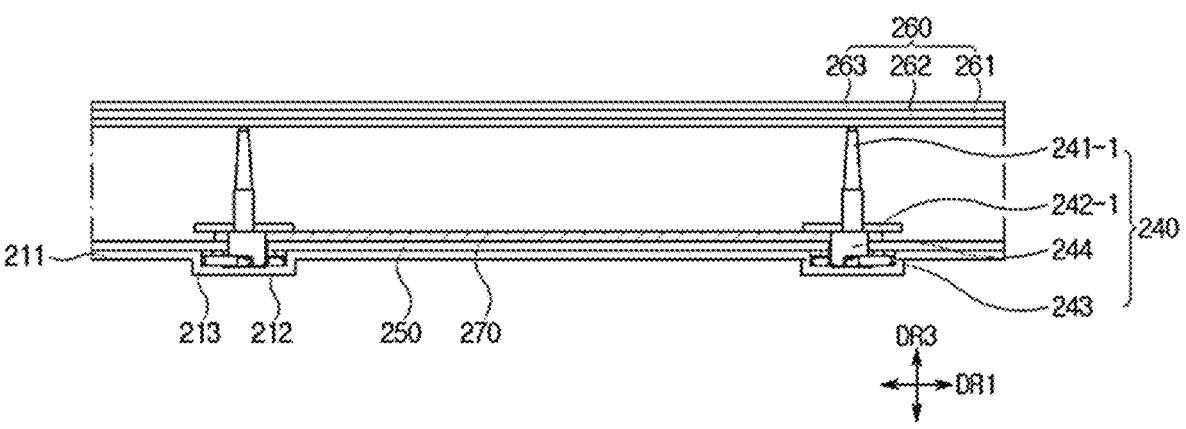
FIG. 11 is a cross sectional view showing a bottom chassis, a reflective sheet, a wire portion, a support, and an optical sheet of the liquid crystal display device of FIG. 10.

FIG. 10 is an exploded perspective view of a liquid crystal display device according to another embodiment of the present disclosure. FIG. 11 is a cross sectional view showing a bottom chassis, a reflective sheet, a wire portion, a support, and an optical sheet of the liquid crystal display device of FIG. 10.

Referring to FIGS. 10 and 11, a support 240-1 of the liquid crystal display device according to the embodiment is different from the support 240 according to FIG. 4 in that the thickness of a body portion 242-1 is reduced.

Describing in more detail, the first portion 242*a* and the third portion 242*c* shown in FIG. 4 can be omitted in the body portion 242-1 shown in FIGS. 10 and 11. For example, the body portion 242-1 can be substantially the same as the second portion 242*b* of FIG. 4. A support portion 241-1 shown in FIGS. 10 and 11 can be directly connected to the body portion 242-1.

Since other descriptions have been made above in FIGS. 1 and 4, detailed descriptions thereof will be omitted.

Figure 12:
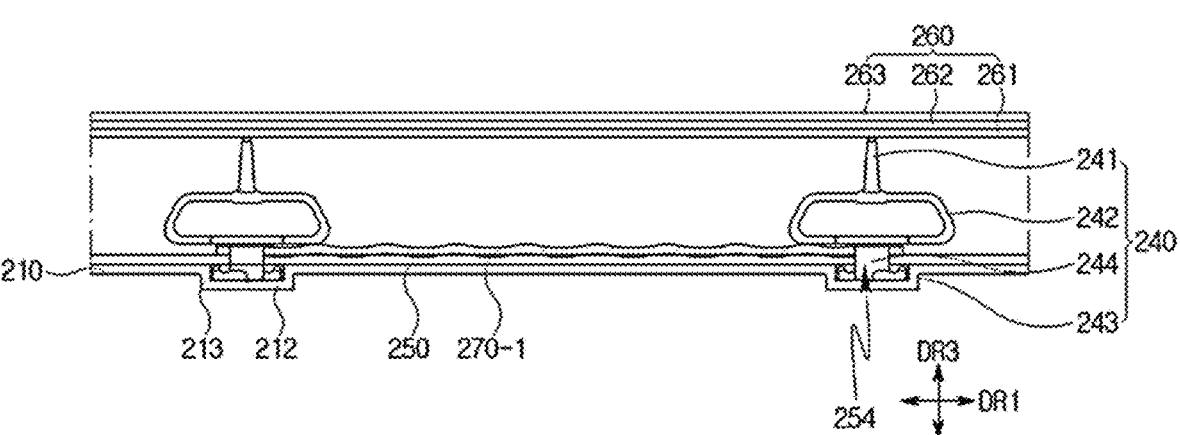
FIGS. 12 and 13 are cross sectional views showing a bottom chassis, a reflective sheet, a wire portion, a support, and an optical sheet of a liquid crystal display device according to further another embodiment of the present disclosure.
Figure 13:
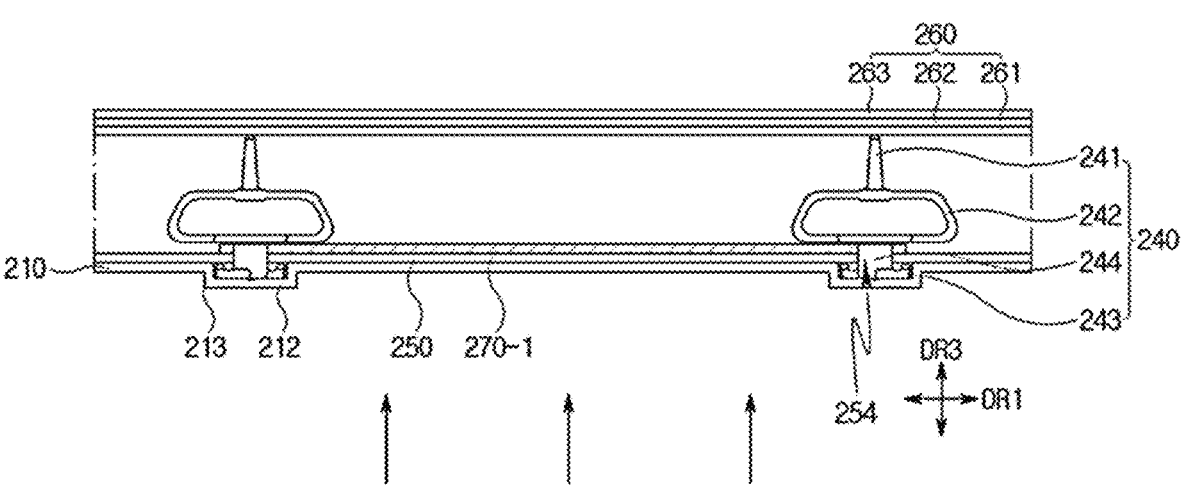

FIGS. 12 and 13 are cross sectional views showing a bottom chassis, a reflective sheet, a wire portion, a support, and an optical sheet of a liquid crystal display device according to further another embodiment of the present disclosure.

Referring to FIGS. 12 and 13, a wire portion 270-1 according to the embodiment is different from the wire portion 270 according to FIG. 4 in that a thermal expansion coefficient of the wire portion 270 is 0 or less.

Describing in more detail, the thermal expansion coefficient of the wire portion 270-1 according to the embodiment can be 0 or less. More preferably, the thermal expansion coefficient of the wire portion 270-1 according to the embodiment can be less than 0. For example, when heat is supplied to the wire portion 270-1 (when the temperature of the wire portion 270-1 rises), the volume of the wire portion 270-1 can be decreased.

As shown in FIG. 12, before a predetermined heat is supplied to the wire portion 270-1 (or when the wire portion 270-1 is below a predetermined temperature), not the entire bottom surface of the wire portion 270-1 comes into contact with the top surface of the reflective sheet 250. For example, below a predetermined temperature, the cross-sectional shape of the wire portion 270-1 can have a wave shape.

However, the thermal expansion coefficient of the wire portion 270-1 according to the embodiment is less than 0. Therefore, as shown in FIG. 13, when a predetermined heat is provided to the wire portion 270-1 (or the wire portion 270-1 has a temperature higher than a predetermined temperature) by that the heat radiated from the light sources 222 and provided to the reflective sheet 250 is provided to the wire portion 270-1, the volume of the wire portion 270-1 can be reduced. As a result, the wire portion 270-1 becomes flat, and the entire bottom surface of the wire portion 270-1 comes into contact with the top surface of the reflective sheet 250, thereby preventing the lifting of the reflective sheet 250.

Since other descriptions have been made above in FIGS. 1 and 9, detailed descriptions thereof will be omitted.

Figure 14:
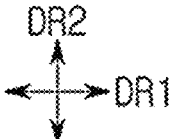
FIG. 14 is a plan view showing an optical lens, a support, and a wire portion according to yet another embodiment of the present disclosure.

FIG. 14 is a plan view showing an optical lens, a support, and a wire portion according to yet another embodiment of the present disclosure.

Referring to FIG. 14, a wire portion 270-2 of a liquid crystal display device according to the embodiment is different from the wire portion 270 according to FIG. 3 in that the wire portion 270-2 can connect three or more supports 240. FIG. 14 shows that the wire portion 270-2 connects four supports 240.

Describing in more detail, in the embodiment, the wire portion 270-2 can connect four supports 240 on a plane, and can form a closed loop that connects four adjacent planar supports 240. According to the embodiment, the number of supports 240 connected by the wire portion 270-2 can change.

According to the embodiment, since the wire portion 270-2 forms the closed loop that connects the four adjacent supports 240 on a plane, an area where the wire portion 270-2 presses the reflective sheet 250 becomes wider. Therefore, there is an advantage that the lifting of the reflective sheet 250 can be more easily prevented.

Figure 15:
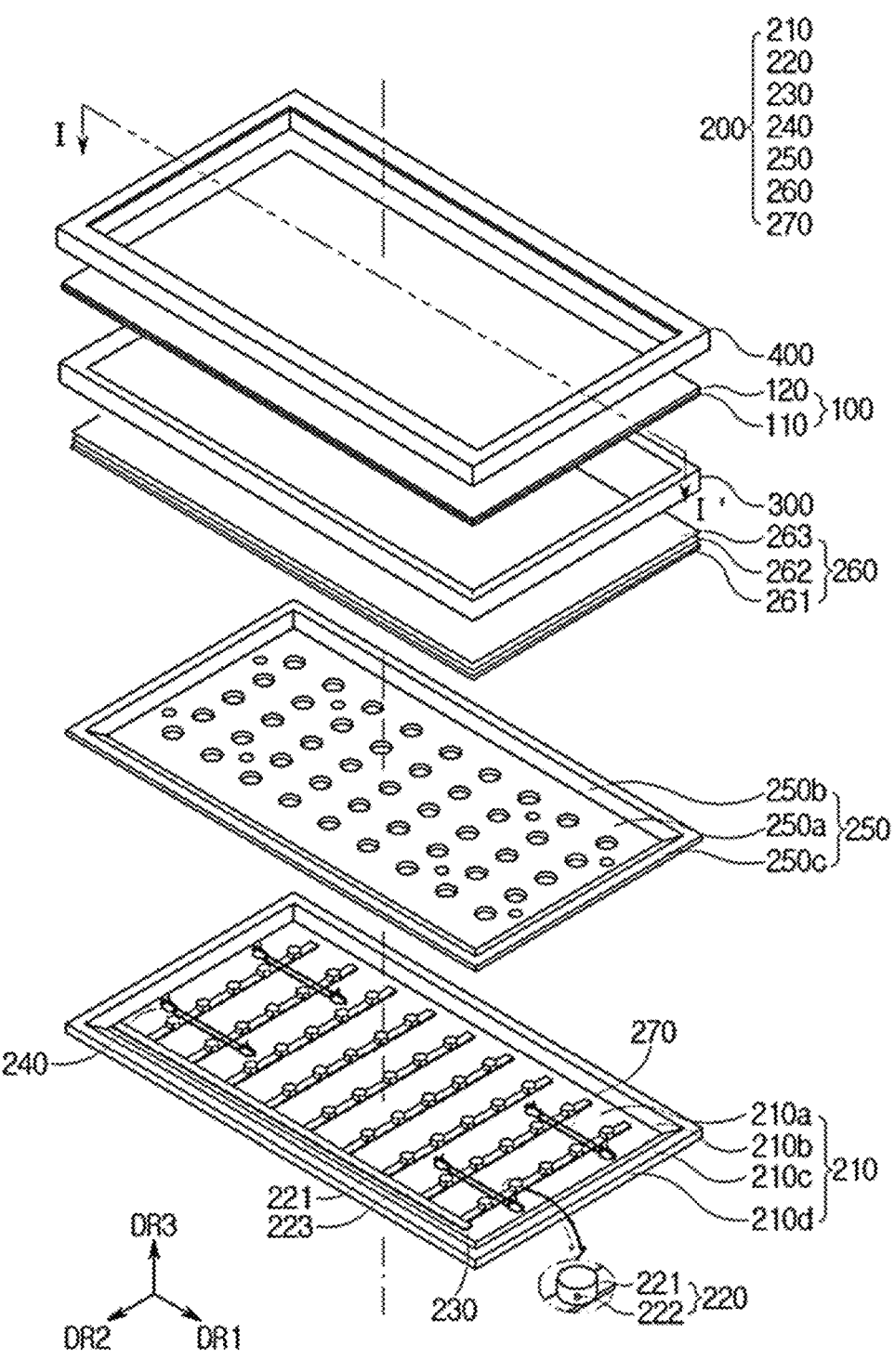
FIG. 15 is an exploded perspective view of a liquid crystal display device including a backlight unit according to still another embodiment of the present disclosure.

FIG. 15 is an exploded perspective view of the liquid crystal display device including a backlight unit according to still another embodiment of the present disclosure. Referring to FIG. 15, the liquid crystal display device is different from the liquid crystal display device according to FIG. 1 in that the first support set of FIG. 1 can be disposed between the wall 210*d* extending in the second direction DR2 on the other side of the first direction DR1 on a plane and the substrate 221 disposed adjacent to one side of the first direction DR1 and the third support set can be disposed between the wall 210*d* extending in the second direction DR2 on one side of the first direction DR1 on a plane and the substrate 221 disposed adjacent to the other side of the first direction DR1.

As a result, the wire portion 270 that connects the first support set and the second support set is disposed adjacent to the wall 210*d* on the other side of the first direction DR1, and the wire portion 270 that connects the third support set and the fourth support set is disposed adjacent to the wall 210*d* on the other side of the first direction DR1. The wire portion 270 connecting the four support sets is disposed adjacent to the wall 210*d* on one side of the first direction DR1.

According to the embodiment, the wire portion 270 is disposed adjacent to the wall 210*d* on the other side of the first direction DR1 and the wall 210*d* on one side of the first direction DR1, respectively. Therefore, there is an advantage that the lifting of the reflective sheet 250 can be more easily prevented.

Since other descriptions have been made above in FIGS. 1 and 9, detailed descriptions thereof will be omitted.

Figure 16:
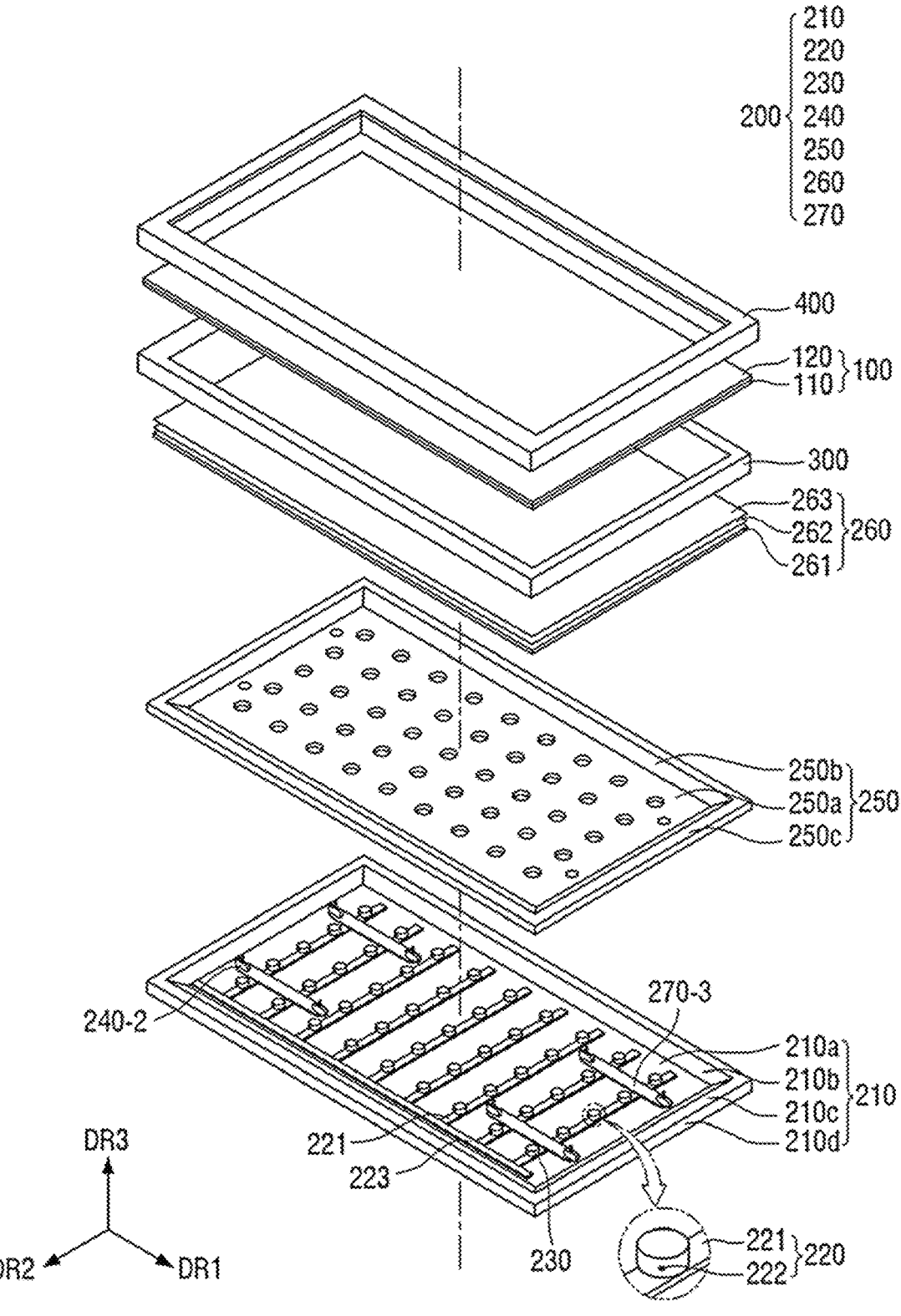
FIG. 16 is an exploded perspective view of a liquid crystal display device including a backlight unit according to still another embodiment of the present disclosure.
Figure 17:
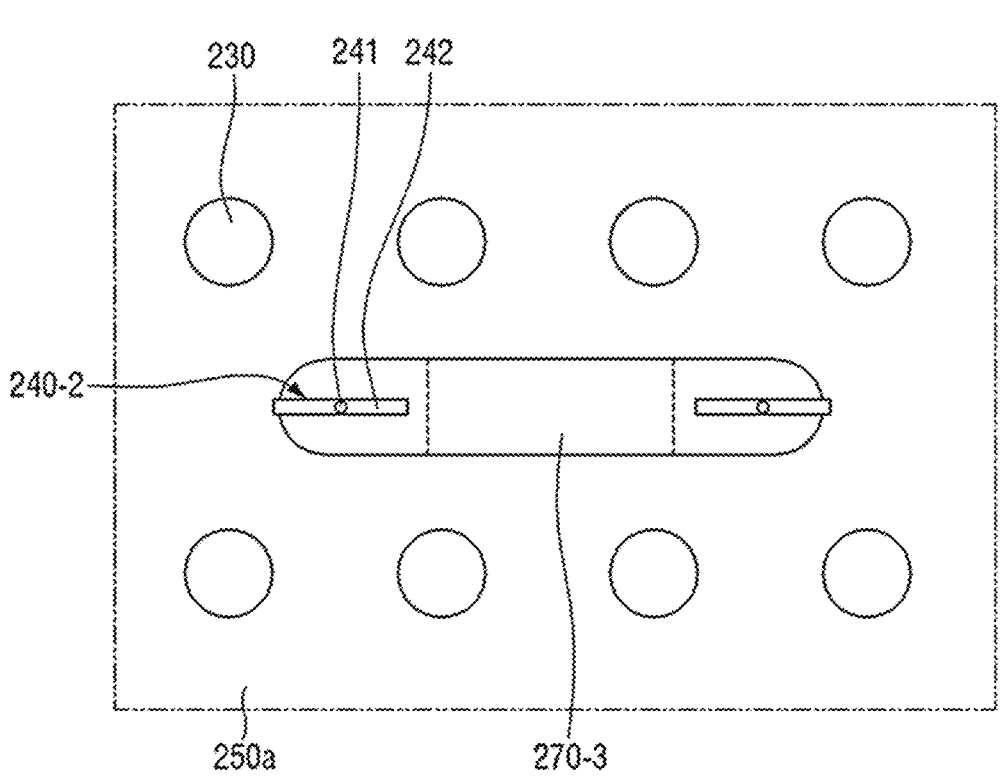
FIG. 17 is a plan view showing an optical lens, a support, and a connecting portion according to the embodiment of the present disclosure.
Figure 17:
Figure 18:
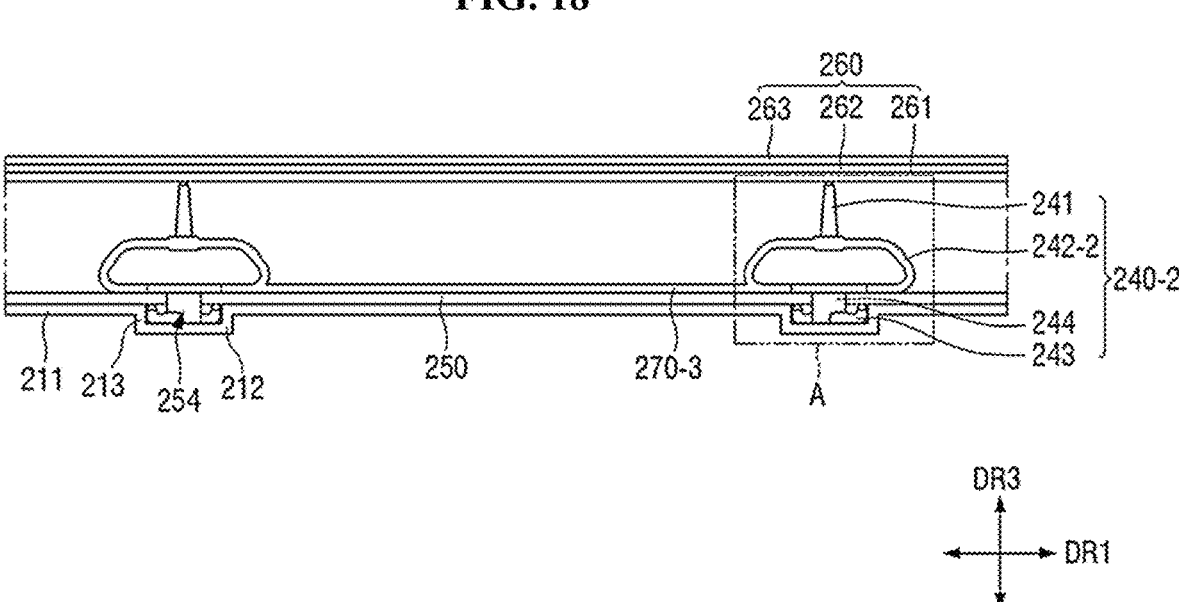
FIG. 18 is a cross sectional view showing a bottom chassis, a reflective sheet, the connecting portion, the support, and an optical sheet of the liquid crystal display device of FIG. 16.
Figure 19:
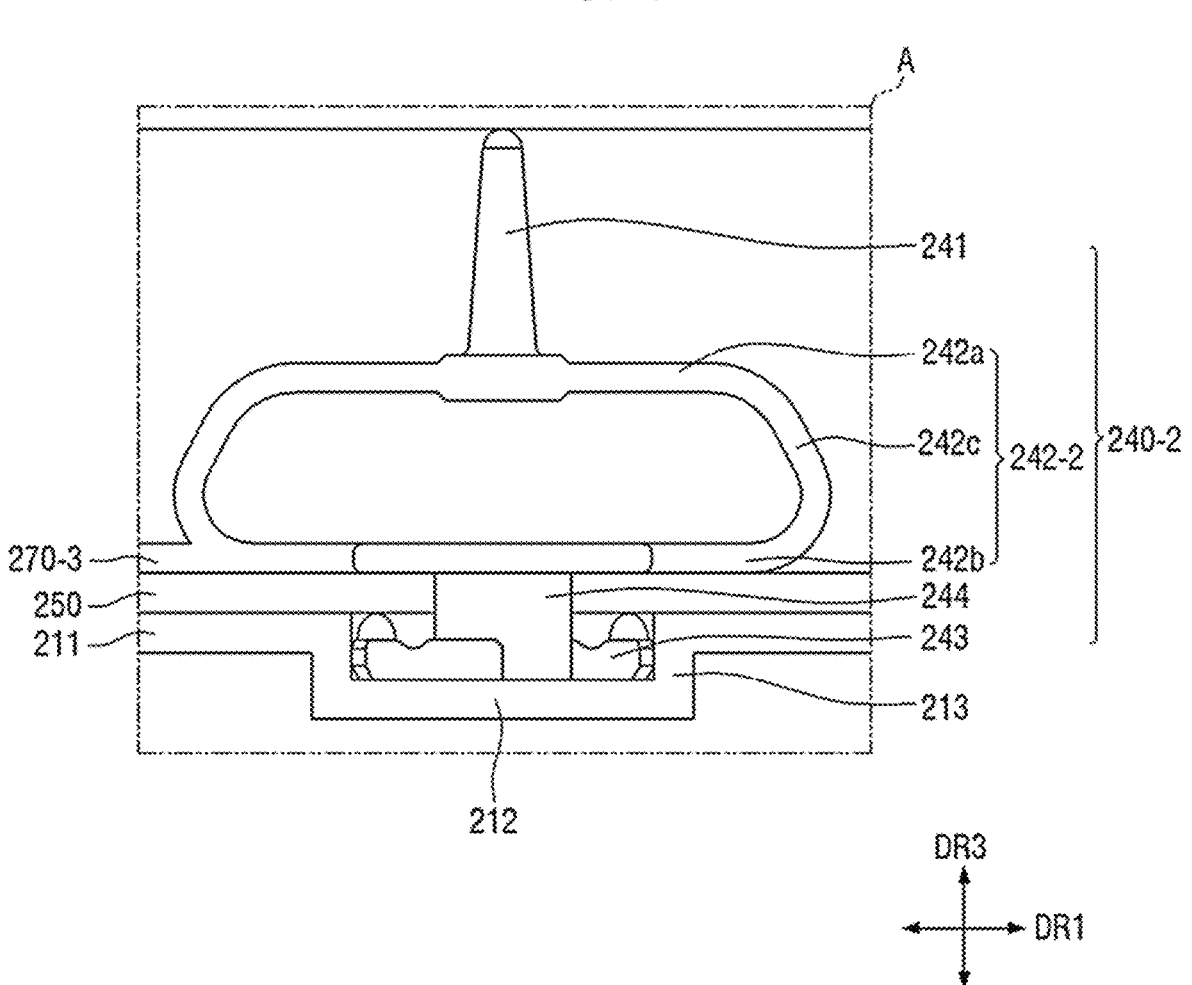
FIG. 19 is an enlarged cross-sectional view of a region "A" of FIG. 18.

FIG. 16 is an exploded perspective view of a liquid crystal display device including a backlight unit according to still another embodiment of the present disclosure. FIG. 17 is a plan view showing an optical lens, a support, and a connecting portion according to the embodiment. FIG. 18 is a cross sectional view showing a bottom chassis, a reflective sheet, the connecting portion, the support, and an optical sheet of the liquid crystal display device of FIG. 16. FIG. 19 is an enlarged cross-sectional view of a region "A" of FIG. 18.

Referring to FIGS. 16 to 19, the liquid crystal display device according to the embodiment is different from the liquid crystal display device according to FIG. 15 in that it includes a support 240-2 and a bridge 270-3.

Describing in more detail, the liquid crystal display device includes the support 240-2 and the bridge 270-3 that connects the adjacent supports 240-2. While the wire portion 270 in the liquid crystal display device according to FIG. 15 connects the adjacent supports 240, the bridge 270-3 in the liquid crystal display device according to the embodiment can connect the adjacent supports 240-2. The bridge 270-3 can be directly connected to each of the adjacent supports 240-2.

Although FIGS. 16 and 17 show that the bridge 270-3 connects two adjacent supports 240-2, the bridge 270-3 is not limited thereto. In three or more supports 240-2 disposed continuously, adjacent supports 240-2 can be connected to each other through the bridge 270-3. The two adjacent supports 240-2 and the bridge 270-3 connecting them can form one support structure.

Hereinafter, for convenience of description, the description will focus on how the two supports 240-2 and the bridge 270-3 that connects them form one support structure.

Further, although FIG. 16 shows that the bridge 270-3 connects the adjacent supports 240-2 in the first direction DR1, the bridge 270-3 is not limited thereto. The bridge 270-3 can connect the adjacent supports 240-2 in the second direction DR2.

As shown in FIGS. 18 and 19, body portions 242-2 of the adjacent supports 240-2 can be connected to each other through the bridge 270-3. The body portion 242-2 can be placed directly on the top surface of the reflective sheet 250. Further, the bridge 270-3 can also be placed directly on the top surface of the reflective sheet 250.

For example, the bridge 270-3 can connect the second portions 242b of the adjacent supports 240-2 to each other.

For example, when the light source unit 220 is received in the bottom chassis 210 and the light sources 222 of the light source unit 220 are driven and emit light, a predetermined heat can be radiated from the light sources 222 and the radiated heat can be transferred through the bottom chassis 210 to the reflective sheet 250 disposed on the bottom chassis 210. When the heat is provided to the reflective sheet 250, the reflective sheet 250 can be lifted from the bottom chassis 210. As described above, the reflective sheet 250 can serve to increase light efficiency by reflecting the light emitted from the optical lens 230 and light reflected by another structure such as a diffusion plate 261 and finally directing the light toward the liquid crystal display panel 100.

In the case where the reflective sheet 250 is lifted, when the light emitted from the optical lens 230 is reflected by the lifted reflective sheet 250, the reflected light does not reach an area overlapping the optical lens 230, resulting in the generation of a dark portion that is not visible on the screen.

However, in the embodiment, the bridge 270-3 comes into direct contact with the top surface of the reflective sheet 250, thereby pressing the reflective sheet 250 that overlaps the bridge 270-3. Therefore, in the backlight unit of the embodiment, it is possible to minimize the lifting of the reflective sheet 250.

Due to this configuration, it is possible to prevent in advance the dark portion that is generated by the lifting of the reflective sheet 250.

Although the thickness of the bridge 270-3 is shown as being the same as the thickness of the second portion 242b, the thickness of the bridge 270-3 is not limited thereto.

Further, any material capable of press the reflective sheet 250 that is below the bridge 270-3 can be used as the material of the bridge 270-3.

Furthermore, the bridge 270-3 can include an optically transparent material. It is possible to prevent the bridge 270-3 from being visible to the outside. For example, the transmittance of the bridge 270-3 to the visible light can be about 80% or more. For example, the bridge 270-3 can include polyethylene (PE), but is not limited thereto.

Figure 20:
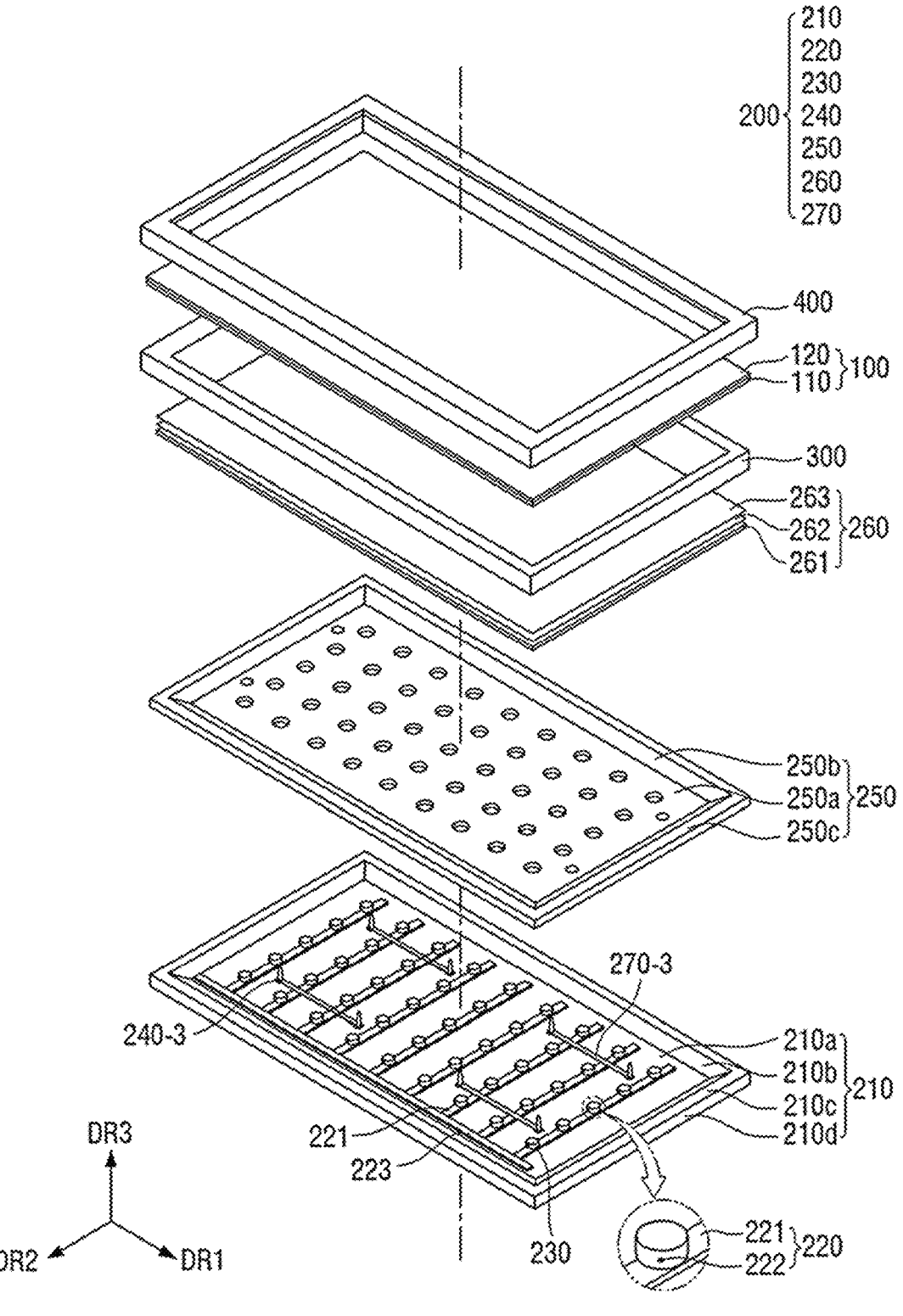
FIG. 20 is an exploded perspective view of a liquid crystal display device according to still another embodiment of the present disclosure.
Figure 21:
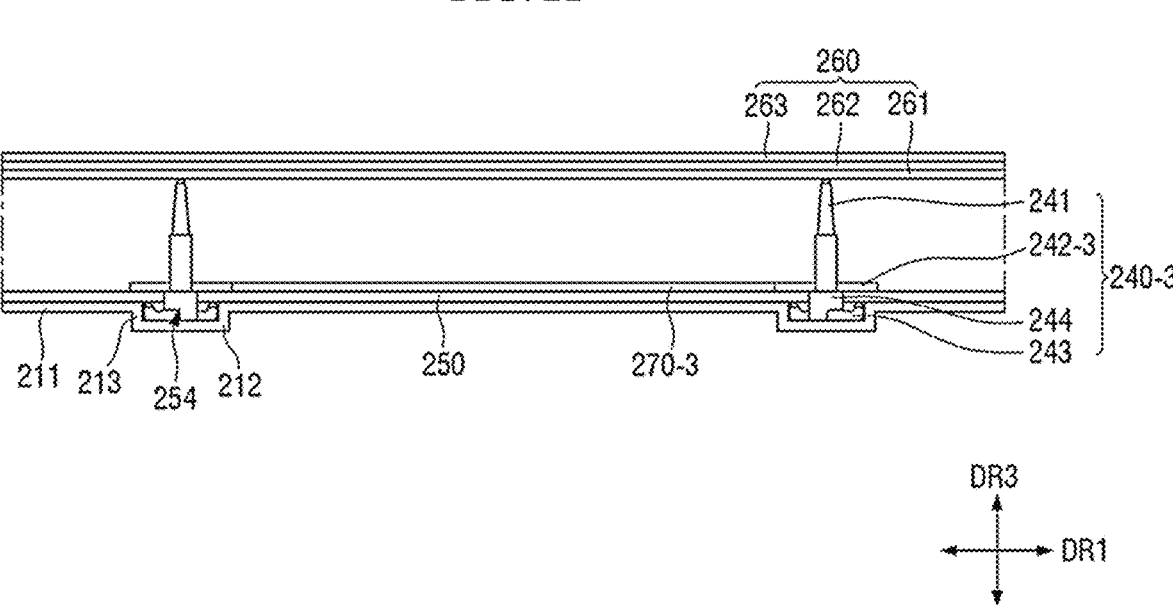
FIG. 21 is a cross sectional view showing a bottom chassis, a reflective sheet, a connecting portion, a support, and an optical sheet of the liquid crystal display device of FIG. 20.

FIG. 20 is an exploded perspective view of a liquid crystal display device according to still another embodiment of the present disclosure. FIG. 21 is a cross sectional view showing a bottom chassis, a reflective sheet, a connecting portion, a support, and an optical sheet of the liquid crystal display device of FIG. 20.

Referring to FIGS. 20 and 21, a support 240-3 of the liquid crystal display device according to the embodiment is different from the support 240 according to FIG. 5 in that the thickness of a body portion 242-3 is reduced.

Describing in more detail, the first portion 242a and the third portion 242c shown in FIG. 4 can be omitted in the body portion 242-3 shown in FIGS. 20 and 21. For example, the body portion 242-3 can be substantially the same as the second portion 242b of FIG. 4. A support portion 241-3 shown in FIGS. 20 and 21 can be directly connected to the body portion 242-3.

The body portions 242-3 of the adjacent supports 240-3 can be directly connected to each other through the bridge 270-3.

Since other descriptions have been made above in FIGS. 1, 4 and 16 to 19, detailed description thereof will be omitted.

While the embodiments, examples and aspects of the present disclosure have been described with reference to the accompanying drawings, it can be understood by those skilled in the art that the present disclosure can be embodied in other specific forms without departing from its spirit or essential characteristics. Therefore, the foregoing embodiments and advantages are merely exemplary and are not to be construed as limiting the present disclosure.

REFERENCE NUMERALS

100: Liquid Crystal Display Panel
200: Backlight Unit
210: Bottom Chassis
210a: Bottom
210b: Wing
210c: Rim
210d: Wall
220: Light Source Unit
221: Substrate
222: Light Source
223: Connecting Board
240: Support
241: Support Portion
242: Body Portion
243: Fastening Portion
244: Connecting Portion
250: Reflective Sheet
260: Optical Sheet
261: Diffusion Plate
262: Prism Sheet
263: Protective Sheet
270: Wire Portion
300: Mold Frame

19

What is claimed is:

1. A backlight unit comprising:

a bottom chassis;

a light source disposed on the bottom chassis;

a reflective sheet disposed on the bottom chassis;

an optical sheet disposed on the light source;

supports disposed between the bottom chassis and the optical sheet, and being spaced apart from each other, the supports supporting the optical sheet; and a wire portion connecting the supports adjacent to each other, wherein the supports include a body portion, and wherein the wire portion overlaps the body portion and the reflective sheet.

2. The backlight unit of claim 1, wherein the wire portion contacts the reflective sheet.

3. The backlight unit of claim 1, wherein the wire portion forms a closed loop on a plane.

4. The backlight unit of claim 3, wherein the wire portion forms a closed loop that surrounds two or more supports.

5. The backlight unit of claim 1, wherein the wire portion is disposed so as not to overlap the light source.

6. The backlight unit of claim 1, wherein the wire portion is disposed adjacent to a side of the bottom chassis.

7. The backlight unit of claim 1, wherein a transmittance of the wire portion to visible light is approximately 80% or more.

8. The backlight unit of claim 1, wherein a thermal expansion coefficient of the wire portion is 0 or less.

9. The backlight unit of claim 8, wherein the wire portion comprises polyethylene (PE).

10. The backlight unit of claim 1, wherein the support comprises a fastening portion that is fastened to the bottom chassis, a support portion that contacts the optical sheet, the body portion that is placed between the fastening portion and the support portion, and a connecting portion that is placed between the body portion and the fastening portion, wherein the reflective sheet is disposed between the fastening portion and the body portion and between the bottom chassis and the body portion, and wherein the wire portion is disposed between the reflective sheet and the body portion.

11. The backlight unit of claim 10, wherein the reflective sheet contacts a top surface of the fastening portion and a top surface of the bottom chassis, respectively.

12. The backlight unit of claim 10, wherein a width of the connecting portion is less than a width of the body portion and a width of the fastening portion.

13. The backlight unit of claim 10, wherein the body portion of the support has an elasticity.

14. A display device comprising:

a display panel; and a backlight unit configured to provide light to the display panel, wherein the backlight unit comprises:

a bottom chassis;

a light source disposed on the bottom chassis;

a reflective sheet disposed on the bottom chassis;

an optical sheet disposed on the light source;

supports disposed between the bottom chassis and the optical sheet, and being spaced apart from each other, the supports supporting the optical sheet; and a wire portion connecting the supports adjacent to each other,

wherein the support comprises a fastening portion that is fastened to the bottom chassis, a support portion that contacts the optical sheet, a body portion that is placed between the fastening portion and the support portion, and a connecting portion that is placed between the body portion and the fastening portion, wherein the reflective sheet is disposed between the fastening portion and the body portion and between the bottom chassis and the body portion, wherein the wire portion is disposed between the reflective sheet and the body portion, wherein the reflective sheet overlaps the fastening portion and the body portion, and wherein the wire portion overlaps the fastening portion and the body portion.

15. The display device of claim 14, wherein the reflective sheet comes into direct contact with a top surface of the fastening portion and a top surface of the bottom chassis, respectively, and wherein the wire portion comes into direct contact with the reflective sheet and the body portion, respectively.

16. The display device of claim 14, wherein a width of the connecting portion is less than a width of the body portion and a width of the fastening portion.

17. The display device of claim 14, wherein a transmittance of the wire portion to visible light is approximately 80% or more.

18. The display device of claim 14, wherein a thermal expansion coefficient of the wire portion is 0 or less.

19. The display device of claim 18, wherein the wire portion comprises polyethylene (PE).

20. A backlight unit comprising:

a bottom chassis;

a light source disposed on the bottom chassis;

a reflective sheet disposed on the bottom chassis;

an optical sheet disposed on the light source;

supports configured to be disposed between the bottom chassis and the optical sheet, and being spaced apart from each other, the supports supporting the optical sheet; and a bridge connecting the supports adjacent to each other, wherein the supports include a body portion, and wherein the bridge overlaps the body portion and the reflective sheet.

21. The backlight unit of claim 20, wherein the bridge contacts the reflective sheet.

22. The backlight unit of claim 20, wherein the bridge is disposed so as not to overlap the light source.

23. The backlight unit of claim 20, wherein the support comprises a fastening portion that is fastened to the bottom chassis, a support portion that contacts the optical sheet, and the body portion that is placed between the fastening portion and the support portion, wherein the reflective sheet is disposed between the fastening portion and the body portion and between the bottom chassis and the body portion, and wherein the bridge is disposed between the reflective sheet and the body portion.

24. The backlight unit of claim 23, wherein the bridge is directly connected to the body portion.

25. A display device comprising:

a display panel; and a backlight unit configured to provide light to the display panel, wherein the backlight unit comprises:

a bottom chassis;

a light source disposed on the bottom chassis;

a reflective sheet disposed on the bottom chassis;

an optical sheet disposed on the light source;

supports disposed between the bottom chassis and the optical sheet, and being spaced apart from each other, the supports supporting the optical sheet; and a bridge connecting the supports adjacent to each other, wherein the support comprises a fastening portion that is fastened to the bottom chassis, a support portion that contacts the optical sheet, and a body portion that is placed between the fastening portion and the support portion, wherein the reflective sheet is disposed between the fastening portion and the body portion and between the bottom chassis and the body portion, wherein the bridge is disposed between the reflective sheet and the body portion, wherein the reflective sheet overlaps the fastening portion and the body portion, and wherein the bridge overlaps the fastening portion and the body portion.

26. The display device of claim 25, wherein the reflective sheet comes into direct contact with a top surface of the fastening portion and a top surface of the bottom chassis, respectively, and wherein the bridge comes into direct contact with the reflective sheet and the body portion, respectively.

27. The backlight unit of claim 25, wherein the bridge is directly connected to the body portion.

28. The backlight unit of claim 1, wherein the wire portion contacts a lower surface of the body portion and an upper surface of the reflective sheet.

29. The backlight unit of claim 20, wherein the bridge contacts a lower surface of the body portion and an upper surface of the reflective sheet.

* * * * *